US011089443B2

(12) United States Patent
Jung et al.

(10) Patent No.: US 11,089,443 B2
(45) Date of Patent: Aug. 10, 2021

(54) ELECTRONIC DEVICE AND METHOD FOR CONNECTING SHORT RANGE COMMUNICATION

(71) Applicant: Samsung Electronics Co., Ltd., Gyeonggi-do (KR)

(72) Inventors: Bu Seop Jung, Gyeonggi-do (KR); Hye Jung Bang, Gyeonggi-do (KR); Doo Suk Kang, Gyeonggi-do (KR); Sun Key Lee, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 88 days.

(21) Appl. No.: 16/279,110

(22) Filed: Feb. 19, 2019

(65) Prior Publication Data
US 2019/0268730 A1 Aug. 29, 2019

(30) Foreign Application Priority Data
Feb. 23, 2018 (KR) .................. 10-2018-0022256

(51) Int. Cl.
H04W 4/08 (2009.01)
H04W 76/14 (2018.01)
(Continued)

(52) U.S. Cl.
CPC ............. *H04W 4/08* (2013.01); *H04L 67/104* (2013.01); *H04W 4/80* (2018.02); *H04W 8/005* (2013.01); *H04W 76/14* (2018.02)

(58) Field of Classification Search
CPC ......... H04W 4/08; H04W 76/14; H04W 4/80; H04W 8/005; H04L 67/104
See application file for complete search history.

(56) References Cited

U.S. PATENT DOCUMENTS

2010/0223345 A1 9/2010 Gupta et al.
2013/0034023 A1* 2/2013 Jung ........................ H04W 4/08
370/255

(Continued)

FOREIGN PATENT DOCUMENTS

EP 2 555 490 A2 2/2013
KR 10-2014-0138071 A 12/2014
(Continued)

OTHER PUBLICATIONS

European Search Report dated Jul. 17, 2019.

*Primary Examiner* — Christopher P Grey
(74) *Attorney, Agent, or Firm* — Cha & Reiter, LLC

(57) ABSTRACT

An electronic device and method are disclosed herein. The electronic device includes a communication circuit, a processor and a memory. The memory stores instructions implementing the method executable by the device, including: establishing a communication group having a first attribute with a first external electronic device by establishing wireless communication with the first external electronic device via the at least one communication circuit, changing the attribute of the communication group from the first attribute to a second attribute while the communication group is maintained, and when wireless communication with a second external electronic device via the communication group is requested, establishing wireless communication with the second external electronic device by the communication group having the second attribute.

20 Claims, 12 Drawing Sheets

(51) Int. Cl.
*H04W 4/80* (2018.01)
*H04W 8/00* (2009.01)
*H04L 29/08* (2006.01)

(56) References Cited

U.S. PATENT DOCUMENTS

| | | | |
|---|---|---|---|
| 2013/0170482 A1* | 7/2013 | Jung | H04W 8/005 |
| | | | 370/338 |
| 2013/0242805 A1* | 9/2013 | Jung | H04L 12/2809 |
| | | | 370/255 |
| 2014/0334464 A1 | 11/2014 | Qi et al. | |
| 2014/0351478 A1 | 11/2014 | Lee et al. | |
| 2015/0043484 A1* | 2/2015 | Jung | H04W 76/40 |
| | | | 370/329 |
| 2015/0208454 A1* | 7/2015 | Cho | H04W 8/005 |
| | | | 370/329 |
| 2015/0245393 A1* | 8/2015 | Lee | H04L 67/1046 |
| | | | 370/338 |
| 2015/0264123 A1* | 9/2015 | Smadi | H04W 84/20 |
| | | | 709/206 |
| 2016/0087967 A1* | 3/2016 | Pang | H04L 63/065 |
| | | | 726/6 |
| 2019/0007801 A1* | 1/2019 | Chaki | H04W 76/14 |
| 2019/0089686 A1* | 3/2019 | Jung | H04L 67/104 |

FOREIGN PATENT DOCUMENTS

| | | |
|---|---|---|
| KR | 10-2015-0087318 A | 7/2015 |
| KR | 10-2016-0108110 A | 9/2016 |
| KR | 10-2017-0036127 A | 3/2017 |
| KR | 10-2017-0046810 A | 5/2017 |

\* cited by examiner

ELECTRONIC DEVICE AND METHOD FOR CONNECTING SHORT RANGE COMMUNICATION

CROSS-REFERENCE TO RELATED APPLICATION

This application claims the priority under 35 U.S.C. § 119(a) to Korean Patent Application Serial No. 10-2018-0022256, which was filed in the Korean Intellectual Property Office on Feb. 23, 2018, the entire content of which is hereby incorporated by reference.

TECHNICAL FIELD

The present disclosure relates to an electronic device and method for connection short range communication.

BACKGROUND

Wi-Fi direct (or Wi-Fi peer to peer) is one type of short range communication scheme which provides direct connection between Wi-Fi electronic devices, by utilizing an existing Wi-Fi interface without using an access point (AP), which is a medium of an existing infrastructure network.

A peer to peer (P2P) group refers to connection between electronic devices using Wi-Fi direct. A particular electronic devices of the P2P group may act as a group owner, and remaining electronic devices may act as group clients. When generating the P2P group, electronic devices may set an attribute of the P2P group to be a persistent group or a temporary group, via a group owner negotiation operation in which the electronic devices each determine whether to operate as a group owner or a group client.

When the attribute of the P2P group is determined to be a persistent group, a participant electronic device using Wi-Fi direct may store information associated with the P2P group. When a P2P group corresponding to the persistent group is generated again later, the electronic device may use the stored information associated with the P2P group to connect, omitting many procedures required for generating the P2P group. Accordingly, relatively quick reconnection may be facilitated.

SUMMARY

An electronic device that uses Wi-Fi direct may determine the attribute of a P2P group as one of a persistent group or a temporary group in a group owner negotiation operation performed for generating the P2P group. The attribute of the P2P group is the same in one group and thus, a persistent group attribute may also be applied to an electronic device that is additionally connected to the P2P group designated as the persistent group. In this instance, the additionally connected electronic device may be automatically connected without user agreement. This may weaken the security of Wi-Fi direct connection, and thereby hamper usability.

According to certain embodiments, there is provided an electronic device and method for connecting short range communication that is capable of dynamically assigning the attribute of a P2P group for each terminal in the P2P group of Wi-Fi direct.

According to certain embodiments, an electronic device may include: at least one communication circuit configured to provide wireless communication based on a Wi-Fi direct protocol, at least one processor operatively connected to the at least one communication circuit, a memory operatively connected to the at least one processor, wherein the memory stores instructions executable by the at least one processor to cause the electronic device to: establish a communication group having a first attribute with a first external electronic device by establishing wireless communication with the first external electronic device via the at least one communication circuit, change the attribute of the communication group from the first attribute to a second attribute while the communication group is maintained, when wireless communication with a second external electronic device via the communication group is requested, establish wireless communication with the second external electronic device by the communication group having the second attribute.

According to certain embodiments, an electronic device may include: at least one communication circuit configured to provide wireless communication based on a Wi-Fi direct protocol, at least one processor operatively connected to the at least one communication circuit, and a memory operatively connected to the at least one processor, the memory storing programming instructions executable by the at least one processor to cause the electronic device to: based on a determined as to whether a designated condition is satisfied, set an attribute of a communication group using one of a first attribute and a second attribute, establish the communication group by initiating wireless communication with the first external electronic device using the set attribute of the communication group, change the attribute of the communication group to the second attribute while the communication group is maintained, and when wireless communication with a second external electronic device via the communication group is requested, establish wireless communication with the second external electronic device using the communication group having the second attribute.

According to certain embodiments, a method in an electronic device, including designating an attribute of a communication group as one of a first attribute and a second attribute, establishing the communication group by initiating wireless communication with a first external electronic device using the set attribute of the communication group, changing the attribute of the communication group to the second attribute while the communication group is maintained, and when wireless communication with a second external electronic device via the communication group is requested, establishing wireless communication with the second external electronic device using the communication group having the second attribute.

According to certain embodiments, there is provided an electronic device and method for connecting short range communication that is capable of dynamically assigning the attribute of a P2P group for each terminal in the P2P group of Wi-Fi direct.

According to certain embodiments, when a P2P group of Wi-Fi direct is established, assigning the attribute of a group for each terminal based on the purpose of each terminal may provide security.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
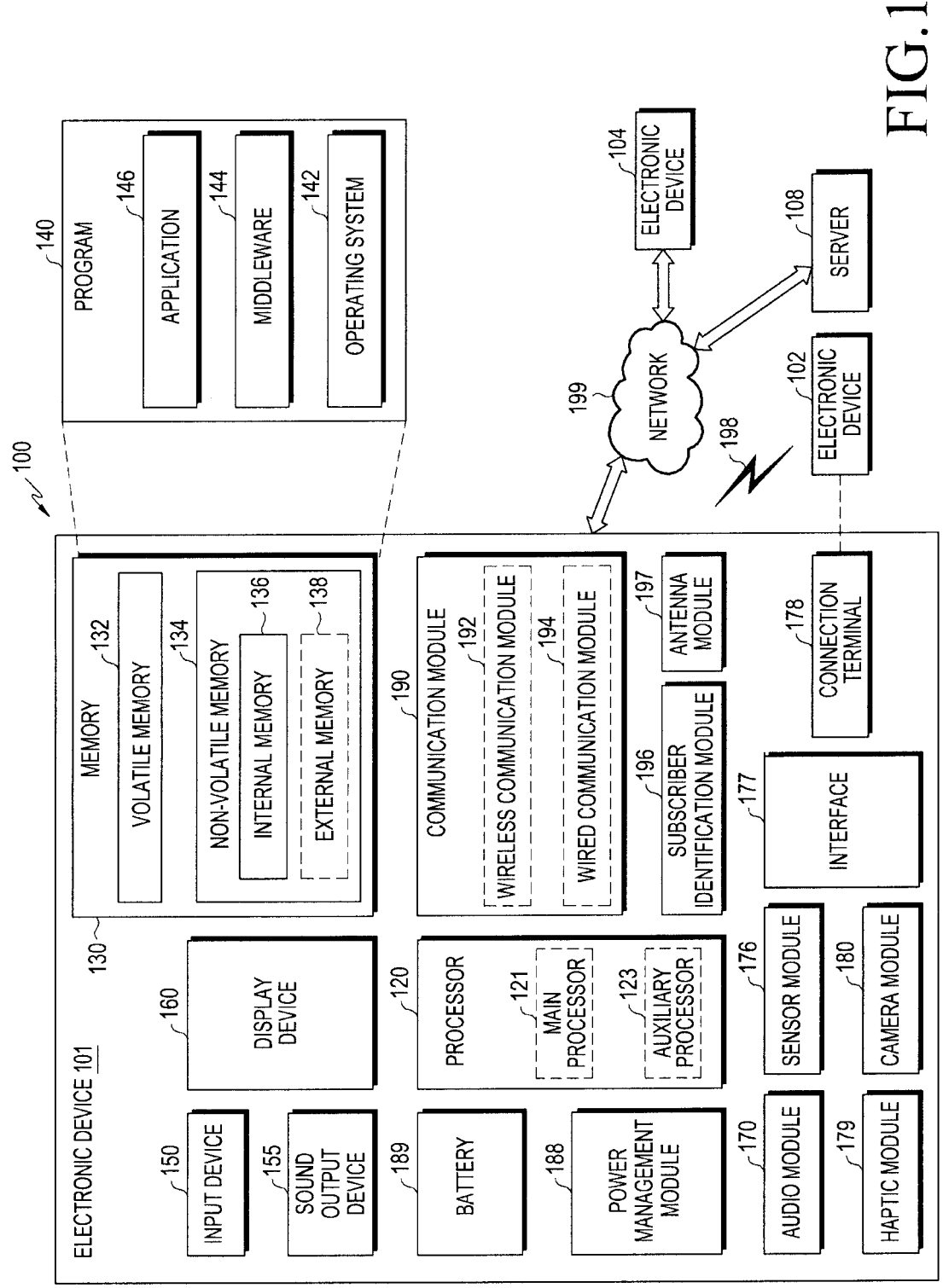
FIG. 1 is a block diagram of an electronic device in a network environment according to certain embodiments.

FIG. 1 is a block diagram illustrating an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may establish the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
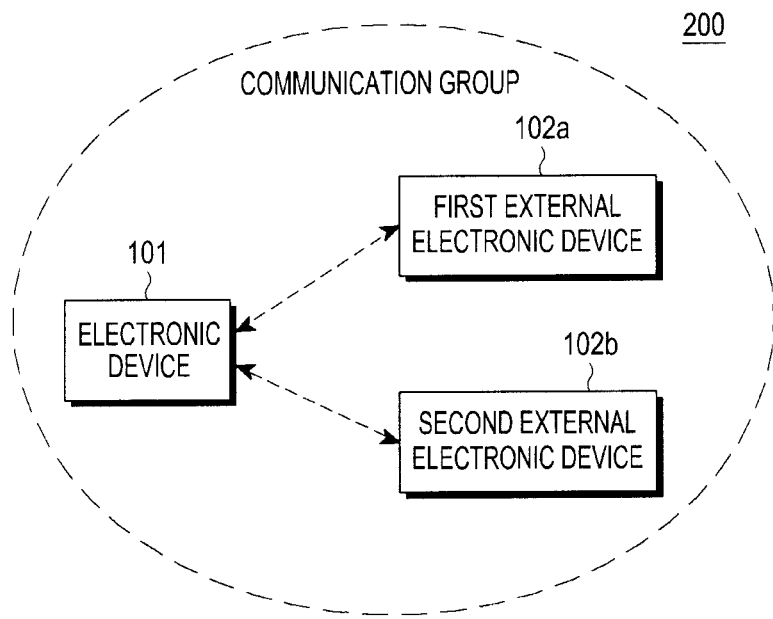
FIG. 2 is a diagram illustrating an example of a communication group for connecting short range wireless communication according to certain embodiments.

FIG. 2 is a diagram illustrating an example 200 of a communication group for connecting short range wireless communication according to certain embodiments.

Referring to FIG. 2, the electronic device 101 (e.g., the electronic device 101 of FIG. 1), a first external electronic device 102a (e.g., the electronic device 102 of FIG. 1), and a second external electronic device 102b (e.g., the electronic device 102 of FIG. 1) according to certain embodiments may perform short range wireless communication (e.g., the first network 198 of FIG. 1). The electronic device 101, the first external electronic device 102a, and the second external electronic device 102b may perform Wi-Fi direct communication based on short range wireless communication network 198. The Wi-Fi direct communication may provide a function that enables Wi-Fi direct certified devices (e.g., the electronic device 101, the first external electronic device 102a, and the second external electronic device 102b) to establish a communication group. The communication group may be a peer to peer group defined in the Wi-Fi direct standard.

For example, a P2P group may be established in a manner that connects a P2P device (e.g., the electronic device 101) that operates as a group owner defined in the Wi-Fi direct standard and another P2P device (e.g., the first external electronic device 102a) that operates as a group client defined in the Wi-Fi direct in a one-to-one match. Alternatively, a P2P group may be established in a manner that connects a P2P device (e.g., the electronic device 101) that operates as a group owner and other P2P devices (e.g., the first external electronic device 102a and the second external electronic device 102b) that operate as group clients in a one-to-N match. FIG. 2 illustrates an example of establishing a P2P group in which the electronic device 101 that operates as a group owner and the first external electronic device 102a and the second external electronic device 102b that operate as group clients are connected in a one-to-N match.

Figure 3:
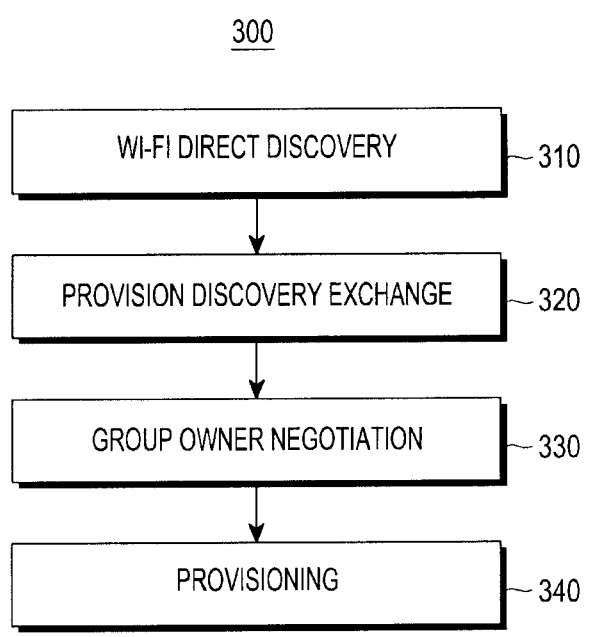
FIG. 3 is a flowchart illustrating an operation of establishing a communication group for connecting short range wireless communication according to certain embodiments.

FIG. 3 is a flowchart 300 illustrating an operation of connecting short range wireless communication according to certain embodiments.

According to certain embodiments, operations 310 to 340 may be executed via the electronic device 101 of FIG. 1 or FIG. 2 or the processor 120. The electronic device 101 may store, in the memory (e.g., the memory 130 of FIG. 1), instructions that enable operations 310 to 340 to be executed.

Referring to FIG. 3, a short range wireless communication connection, according to certain embodiments, may establish a P2P group via a Wi-Fi direct discovery operation, a provision discovery exchange operation, a group owner negotiation operation, and a provisioning operation, and may perform Wi-Fi direction connection via the P2P group.

In operation 310, the electronic device (e.g., the processor 120), according to certain embodiments, may perform Wi-Fi direct discovery via, for example, the communication module 190. For example, the processor 120 may transmit a designated communication signal via the communication module 190, and may scan a communication signal received in response to the transmitted communication signal, thereby discovering the external electronic device 102 (e.g., the electronic device 102 of FIG. 1, the first external electronic device 102a of FIG. 2, or the second external electronic device 102b).

The electronic device 101 may scan a communication signal transmitted from the external electronic device 102, thereby discovering the external electronic device 102. In the present specification, the fact that the electronic device 101 is capable of performing a predetermined operation may indicate that the processor 120 performs the predetermined operation. Alternatively, the fact that the electronic device 101 is capable of performing a predetermined operation may indicate that the processor 120 performs a control to enable hardware included in the electronic device 101 or hardware installed outside the electronic device 101 to perform the predetermined operation. Alternatively, the fact that the electronic device 101 is capable of performing a predetermined operation may indicate that instructions which enable at least one of the processor 120 and the hardware to perform the predetermined operation are stored in the memory 130.

The electronic device 101 (e.g., the processor 120), according to certain embodiments, may perform a discovery by exchanging a message defined in the Wi-Fi direct standard (e.g., a probe request or a probe response). According to another embodiment, the electronic device 101 may perform a discovery based on another communication scheme (e.g., Bluetooth low energy (BLE), near field communication (NFC), or Bluetooth (BT)), and may subsequently switch to a Wi-Fi direct connection procedure.

The electronic device 101, according to certain embodiments, may perform a low-power discovery operation based on a neighbor awareness networking (NAN) (or Wi-Fi aware) technology by a Wi-Fi alliance. NAN technology is a type of Wi-Fi-based low-power discovery technology, and is technology that synchronizes terminals with a network called "NAN cluster". In this instance, the terminals are capable of transmitting and receiving a beacon and a service discovery frame within a synchronized discovery window (DW). Within the DW, the terminals may be synchronized based on at least one of time and frequency. In an interval beyond the DW, the terminals may maintain the sleep state, whereby a discovery state is continued with low power. Alternatively, the terminals may designate an active time interval between DWs, and an additional service discover may be performed during the active time interval. Alternatively, the terminals may designate an operation for connecting Wi-Fi direct, mesh, an independent basic service set (IBSS), or a wireless local area network (WLAN) in an interval between DWs, and may perform an operation for discovery and connection via a legacy Wi-Fi. In addition, various applications that enable neighboring devices to exchange services and information, may be applied to the present disclosure.

In operation 320, the electronic device 101 (e.g., the processor 120), according to certain embodiments, may perform a provision discovery exchange via, for example, the communication module 190. The electronic device 101 may automatically or manually select at least one of the discovered external electronic devices (e.g., the external electronic device 102) as a device to be connected. The electronic device 101 may transmit a communication signal including a Wi-Fi simple configuration (WSC) method, to the selected external electronic device 102. Particularly, a push button configuration (PBC) method or a personal identification number (PIN) method may be used as the WSC method. According to the PBC method, two electronic devices are connected to each other by pressing a button within a designated period of time. According to the PIN method, two electronic device are connected to each other by inputting the password (PIN) of a partner electronic device. For example, the electronic device 101 may display its password and may receive the input of the password of the external electronic device 102. A user of the external electronic device 102 may identify the password of the electronic device 101 and may input the same to the external electronic device 102. The selected external electronic device 102 may display at least a part of the received communication signal via a pop-up. The pop-up may include at least one from among identification information (e.g., a name) of the electronic device 101 that requests a provision discovery, whether a connection is accepted, and a password (PIN) value to be used for the WSC. When a connection acceptance command is received from the user of the external electronic device 102 via the pop-up, the external electronic device 102 may perform a connection acceptance control operation.

In operation 330, the electronic device 101 (e.g., the processor 120), according to certain embodiments, may perform a group owner negotiation with the external electronic device 102. A group owner may act as an access point (AP) in the Wi-Fi direct group. A group client may act as a station in the Wi-Fi direct group. The electronic device 101 may exchange a group owner (GO) negotiation request message, a group owner (GO) negotiation response message, and a group owner (GO) negotiation confirm message, with the external electronic device 102 via, for example, the communication module 190. The GO negotiation request message may include the group owner intent of the electronic device 101, which is a numerical value for setting a GO. The GO negotiation response message may include the group owner intent of the external electronic device 102. The electronic device 101 may compare the group owner intent of the electronic device 101 and the group owner intent of the external electronic device 102, and may determine the role of the electronic device 101 as one of the group owner and the group client based at least on a comparison result. The electronic device 101 may transmit the GO negotiation confirmation message including confirm information associated with the determined role. In addition, the electronic device 101 may determine a P2P group attribute after connecting, an operating channel, and a listening timing in the group owner negotiation operation. In the group owner negotiation operation, the electronic device 101 may determine whether the established Wi-Fi direct group is to be used as a persistent group or a temporary group. When it is determined that the established Wi-Fi direct group is to be used as a persistent group, the electronic device 101 may store the credential (an authentication type, an encryption type, a network key, or an SSID) and the role (e.g., one of a group owner and a group client) of the external electronic device 102, which is a device to be connected. For example, P2P capability may include P2P group capability information, and the electronic device 101 may set a persistent P2P group bit of the P2P group capability information to 1.

In operation 340, the electronic device 101 (e.g., the processor 120), according to certain embodiments, may perform a provisioning operation via, for example, the communication module 190. For example, when the electronic device 101 is a group owner, the electronic device 101 may act as a WSC registrar, and the external electronic device 102 that is a group client may act as a WSC enrollee. The electronic device 101 and the external electronic device 102 may perform a provisioning operation that exchanges credentials with each other. When the operation ends, two electronic devices may complete a group formation operation for establishing a P2P group. When the establishing of the group is completed, the electronic device 101 determined to be a group owner may initiate the role of the group owner via an operating channel, and may transmit a beacon, like an AP. For example, the external electronic device 102 determined to be a group client may connect to the group owner and may perform a 4-way handshake operation based at least on the credential identified via the provisioning operation. When the 4-way handshake operation is completed, a connection is established between the two electronic devices.

According to certain embodiments, a provision discovery may be used as a trigger message for reconnecting a persistent group. In an operation for reconnecting electronic devices which were previously connected, the electronic device 101 that triggers connection may transmit a provision discovery request by including the group identifier of a persistent group in the provision discovery request. In this instance, the group identifier may be a value established by combining the service set identifier (SSID) which is generated by a group owner of the previously connected persistent group, and the device address of the group owner.

Figure 4:
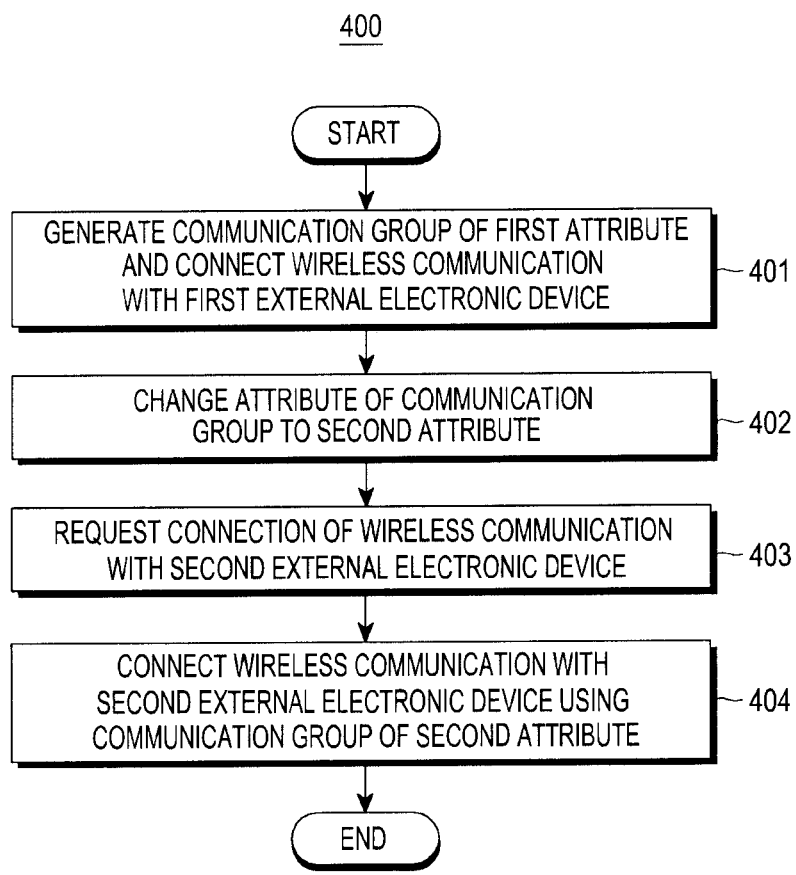
FIG. 4 is a flowchart illustrating an operation of connecting short range wireless communication by an electronic device according to certain embodiments.

FIG. 4 is a flowchart 400 illustrating an operation of connecting short range wireless communication by an electronic device according to certain embodiments.

According to certain embodiments, operations 401 to 404 may be executed via the electronic device 101 of FIG. 1 or FIG. 2 or the processor 120. The electronic device 101 may store, in a memory (e.g., the memory 130 of FIG. 1), instructions that enable operations 401 to 404 to be performed.

In operation 401, the electronic device 101 (e.g., the processor 120), according to certain embodiments, may establish a communication group having a first attribute with a first external electronic device (e.g., the electronic device 102 of FIG. 1 or the first external electronic device 102a of FIG. 2), and may connect via wireless communication. For example, the electronic device 101 may connect via wireless communication with the first external electronic device 102a based on a Wi-Fi direct protocol, via the communication module 190 (e.g., a wireless communication circuit). The communication module 190 of the electronic device 101 may provide wireless communication based on an infrastructure communication protocol or a peer to peer (P2P) communication protocol. The infrastructure communication protocol may include a Wi-Fi protocol or IEEE 802.11, and the P2P communication protocol may include a Wi-Fi direct protocol. Also, the communication group having the first attribute may include a persistent group defined in the Wi-Fi direct protocol. For example, when the Wi-Fi direct connection may be frequently requested in a trusted context, such as when the electronic device 101 and the first external electronic device 102 belong to the same user, when the group is established commonly in a trusted environment (e.g., home or office), when Wi-Fi direct connection is set for a frequently utilized service, or for a service that mandates utilization of a persistent group (e.g., a Wi-Fi Serial Bus or "WSB" function), the electronic device 101 may establish the attribute of a communication group as the first attribute (e.g., persistent group), and may establish wireless communication.

According to certain embodiments, the electronic device 101 may establish a P2P group via a Wi-Fi direct discovery operation, a provision discovery exchange operation, a group owner negotiation operation, and a provisioning operation, and may perform Wi-Fi direction connection via the P2P group.

The electronic device 101 may transmit a request for connecting to the first external electronic device 102a from among at least one external electronic device discovered in the Wi-Fi direct discovery operation, or may receive a connection request from the first external electronic device 102a. For example, the electronic device 101 may perform a discovery by exchanging a message defined in the Wi-Fi direct standard (e.g., a probe request or a probe response). Alternatively, the electronic device 101 may perform a discovery based on another communication scheme (e.g., Bluetooth low energy (BLE), near field communication (NFC), or Bluetooth (BT)), and may subsequently switch to a Wi-Fi direct connection procedure.

The electronic device 101 may automatically or manually select the first external electronic device 102a from among the at least one discovered external electronic device as a device to be connected, and may perform a provision discovery exchange operation. For example, the electronic device 101 may transmit a communication signal including a Wi-Fi simple configuration (WSC) method. A push button configuration (PBC) method or a personal identification number (PIN) method may be used as the WSC method. The electronic device 101 may identify whether users of the electronic device 101 and the first external electronic device 102a accept Wi-Fi direct connection via the provision discovery exchange operation, and may complete the provision discovery operation when the Wi-Fi direct connection is accepted.

When the provision discovery operation is completed, the electronic device 101 may perform a group owner negotiation operation. A group owner may act as an access point (AP) in the Wi-Fi direct group. A group client may act as a station in the Wi-Fi direct group. The electronic device 101 may exchange a group owner (GO) negotiation request message, a group owner (GO) negotiation response message, and a group owner (GO) negotiation confirm message with the first external electronic device 102a. The GO negotiation request message and the GO negotiation response message may include at least one from among a Wi-Fi display information element (WFD IE), a peer to peer information element (P2P IE), and a Wi-Fi simple configuration information element (WSC IE). The WFD IE is information that may be included when an operation attribute of an electronic device uses the Wi-Fi display standard. The P2P IE includes P2P attribute information of at least some of P2P Capability, P2P Device ID, Group Owner Intent, P2P Device Info, P2P Group Info, P2P Group ID, Advertised Service Info, and Persistent Group Info. The WSC IE may include information of at least some of Device Password ID, Manufacturer, Model Name, Model Number, Serial Number, Device Name, and Requested Device Type (Primary Device Type). In the group owner negotiation operation, the electronic device 101 may determine whether the attribute of the established P2P group is to be a persistent group or a temporary group. When the P2P group is determined to be a persistent group, the electronic device 101 may store information associated with the P2P group. The information associated with the P2P group may include the credentials (an authentication type, an encryption type, a network key, or an SSID) and the roles (e.g., one of a group owner and a group client) of the electronic device 101 and the first external electronic device 102a which belong to the communication group. Also, the information associated with the P2P group may be equally stored in the first external electronic device 102a.

When a group owner and a group client are determined via the group owner negotiation operation, the electronic device 101 may perform a provisioning operation. For example, when the electronic device 101 is a group owner, the electronic device 101 may act as a WSC registrar, and the first external electronic device 102a, which is a group client, may act as a WSC enrollee. The electronic device 101 and the first external electronic device 102a may perform a provisioning operation that exchanges credentials with each other. When the operation ends, two electronic devices may complete a group formation operation for establishing a P2P group. When the establishing of the group is completed, the electronic device 101 determined to be a group owner may initiate the role of the group owner via an operating channel. For example, the electronic device 101 may transmit a beacon, like an AP. The first external electronic device 102a, which is determined to be a group client, may connect to the group owner and may perform a 4-way handshake operation based at least on the credential identified via the provisioning operation. When the 4-way handshake operation is completed, connection may be established between the two electronic devices.

In operation 402, the electronic device 101 (e.g., the processor 120), according to certain embodiments, may change the attribute of the communication group that the electronic device 101 establishes together with the first external electronic device 102a. That is the existing attribute may be changed from the first attribute to a second attribute. The electronic device 101 may change the attribute of the communication group from the first attribute to the second attribute in a state in which the communication group is maintained. For example, when the electronic device 101 is acting as a group owner in the communication group, the electronic device 101 may change the attribute of the communication group from the first attribute to the second attribute. For example, the communication group having the second attribute may include a temporary group defined in the Wi-Fi direct protocol.

According to certain embodiments, the electronic device 101 may connect Wi-Fi direct communication with the first external electronic device 102a via the communication group established to have the first attribute (e.g., a persistent group), and may change the attribute of the communication group from the first attribute to the second attribute in the state in which the communication group is maintained. For example, the electronic device 101 may change the persistent P2P group bit of a group capability bitmap indicating P2P group capability from 1 to 0 so as to deactivate the persistent P2P group bit, may include the deactivated persistent P2P group bit information in a message, which is transmitted by the electronic device 101 operating as the group owner (e.g., a beacon frame, a probe response, or an association response), and may transmit the message, whereby the attribute of the communication group is changed from the first attribute to the second attribute. According to an embodiment, when a communication group is established to have the second attribute (e.g., a temporary group) and the electronic device 101 may connect Wi-Fi direct communication with the first external electronic device 102a via the communication group established to have the second attribute, the electronic device 101 may keep the attribute of the communication group having the second attribute. For example, the electronic device 101 may set the persistent P2P group bit of the group capability bitmap indicating P2P group capability to 0 so as to deactivate the persistent P2P group bit, may include the deactivated persistent P2P group bit information in a message which is transmitted by the electronic device 101 operating as the group owner (e.g., a beacon frame, a probe response, or an association response), and may transmit the message, whereby the attribute of the communication group may be maintained as the second attribute. According to an embodiment, when a communication group is established to have the second attribute (e.g., a temporary group) and the electronic device 101 may connect Wi-Fi direct communication with the first external electronic device 102a via the communication group established to have the second attribute, the electronic device 101 may change the attribute of the communication group from the second attribute to the first attribute. For example, the electronic device 101 may change the persistent P2P group bit of the group capability bitmap indicating P2P group capability from 0 to 1 so as to activate the persistent P2P group bit, may include the activated persistent P2P group bit information in a message which is transmitted by the electronic device 101 operating as the group owner (e.g., a beacon frame, a probe response, or an association response), and may transmit the message, whereby the attribute of the communication group may be changed from the second attribute to the first attribute.

In operation 403, the electronic device 101 (e.g., the processor 120), according to certain embodiments, may identify a request for establishing wireless communication with a second external electronic device (e.g., the electronic device 102 of FIG. 1 or the second external electronic device 102b of FIG. 2). For example, the electronic device 101 may request the wireless communication connection from the second external electronic device 102b, or may receive a request for establishing wireless communication from the second external electronic device 102b.

According to certain embodiments, the electronic device 101 may establish a P2P group for Wi-Fi direct connection in a one-to-one match and one-to-N match (N is a natural number greater than or equal to 2). In the state in which the P2P group that the electronic device 101 establishes together with the first external electronic device 102a is maintained, the electronic device 101 performs a Wi-Fi direct discovery operation so as to discover at least one external electronic device that desires connection, and may invite the second external electronic device 102b by transmitting an invitation request message including the ID and attribute information of the current group to the second external electronic device 102b from among the at least one discovered external electronic device. The second external electronic device 102b that is invited may transmit an invitation response message, and may perform Wi-Fi direct connection via the established P2P group. In this instance, the invitation request message may be transmitted by any electronic device that desires connection, irrespective of the role of the corresponding electronic device, that is, irrespective of whether the corresponding electronic device is a group owner or a group client of the established group.

According to certain embodiments, in the state in which the P2P group that the electronic device 101 establishes together with the first external electronic device 102a is maintained, the electronic device 101 may receive a connection request from the second external electronic device 102b based on a Wi-Fi direct discovery operation performed by the second external electronic device 102b. For example, the electronic device 101 may perform a discovery by exchanging a message defined in the Wi-Fi direct standard (e.g., a probe request or a probe response) with the second external electronic device 102b, may automatically or manually select the second external electronic device 102b as a device to be connected, and may perform a provision discovery exchange operation. The electronic device 101 may transmit a provision discovery response message including the ID and the attribute information of the current group to the second external electronic device 102b, and may perform Wi-Fi direct connection with the second external electronic device 102b via the established P2P group.

In operation 404, the electronic device 101 (e.g., the processor 120), according to certain embodiments, may establish wireless communication with the second external electronic device 102b using the communication group having the second attribute.

According to certain embodiments, a provisioning operation is then performed in which the electronic device 101, operating as a group owner, and the second external electronic device 102b, operating as a group client, exchange credentials with each other. The communication group having the second attribute is reset as a communication group including the second external electronic device 102b, and the electronic device 101. Then, the second external electronic device 102b connect wirelessly through the communication group having the second attribute.

Figure 5:
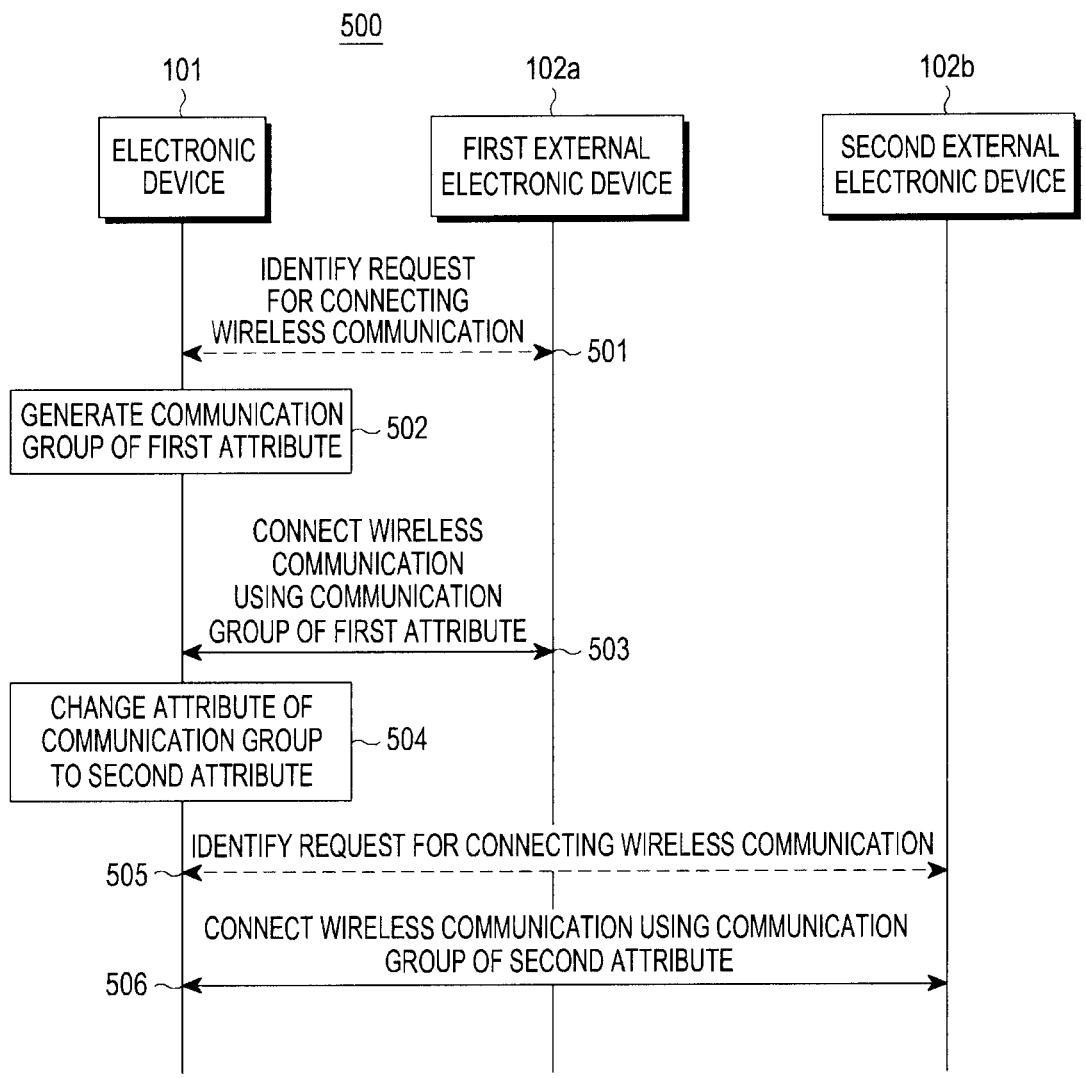
FIG. 5 is a flowchart illustrating an operation of connecting short range wireless communication by an electronic device and external electronic devices according to certain embodiments.

FIG. 5 is a flowchart 500 illustrating an operation of connecting short range wireless communication by an electronic device and external electronic devices according to certain embodiments.

According to certain embodiments, operations 501 to 506 may be executed via the electronic device 101 of FIG. 1 or FIG. 2 or the processor 120. The electronic device 101 may store, in a memory (e.g., the memory 130 of FIG. 1), instructions that enable operations 501 to 506 to be performed.

In operation 501, the electronic device 101 (e.g., the processor 120), according to certain embodiments, may identify a request for establishing wireless communication with the first external electronic device 102a. For example, the electronic device 101 may request the connection of wireless communication from the first external electronic device 102a, or may receive a request for establishing wireless communication from the first external electronic device 102a.

According to certain embodiments, a Wi-Fi direct discovery operation may be performed based on the request from the electronic device 101 or the request from the first external electronic device 102a. The electronic device 101 may transmit a request for connecting to the first external electronic device 102a from among at least one external electronic device discovered in the Wi-Fi direct discovery operation, or may receive a connection request from the first external electronic device 102a. For example, the electronic device 101 may perform a discovery by exchanging a message defined in the Wi-Fi direct standard (e.g., a probe request or a probe response). Alternatively, the electronic device 101 may perform a discovery based on another communication scheme (e.g., Bluetooth low energy (BLE), near field communication (NFC), or Bluetooth (BT)), and may subsequently switch to a Wi-Fi direct connection procedure.

According to certain embodiments, the electronic device 101 may identify a request for connecting Wi-Fi direct with the first external electronic device 102a based on the state of the electronic device 101. For example, the electronic device 101 may identify a request for connecting Wi-Fi direct when an application or service associated with connection of Wi-Fi direct is executed by a user, or may identify the request based on an operation attribute of a currently executed application or service. According to an embodiment, the electronic device 101 may identify a request for connecting Wi-Fi direct with the first external electronic device 102a, based on a message received from the first external electronic device 102a. For example, the electronic device 101 may receive a connection request from the first external electronic device 102a in the Wi-Fi direct discovery operation performed with the first external electronic device. The electronic device 101 may identify the request for connecting Wi-Fi direct based on information included in the message received from the first external electronic device 102a.

In operation 502, the electronic device 101 (e.g., the processor 120), according to certain embodiments, may establish a communication group having a first attribute together with the first external electronic device 102a. For example, the electronic device 101 may perform a provision discovery exchange operation with the first external electronic device 102a. The electronic device 101 may determine whether users of the electronic device 101 and the first external electronic device 102a accept the connection of Wi-Fi direct, and may complete the provision discovery exchange operation when the Wi-Fi direct connection is accepted. When the provision discovery exchange operation is completed, the electronic device 101 may perform a group owner negotiation operation. The electronic device 101 may determine that the electronic device 101 is to operate as a group owner and the first external electronic device 102a is to operate as a group client, via the group owner negotiation operation. The electronic device 101 may perform a provisioning operation based on the determined role, and may establish a P2P group including the electronic device 101 and the first external electronic device 102a. In the group owner negotiation operation, the electronic device 101 may determine the attribute of the established P2P group as one of a persistent group or a temporary group. In the group owner negotiation operation, the electronic device may determine, as a persistent group, the attribute of the P2P group that the electronic device 101 establishes together with the first external electronic device 102a. For example, in the case of a situation that a user may trust in or in a case in which Wi-Fi direct connection is frequently requested, such as when the electronic device 101 and the first external electronic device 102a are devices belonging to the same account user, when a place is a designated place that a user may trust (e.g., home or office), or when Wi-Fi direct connection is for a service that a user frequently uses or a service that utilizes a persistent group (e.g., WSB function), the electronic device 101 may establish the attribute of a P2P group as a persistent group. When the attribute of the P2P group that the electronic device 101 establishes together with the first external electronic device 102a is determined as a persistent group, the electronic device 101 may store information associated with the P2P group of the persistent group. The information associated with the P2P group may include the credentials (an authentication type, an encryption type, a network key, or an SSID) and the roles (e.g., one of a group owner and a group client) of the electronic device 101 and the first external electronic device 102a which belong to the established P2P group. Also, the information associated with the P2P group may be equally stored in the first external electronic device 102.

In operation 503, the electronic device 101 (e.g., the processor 120), according to certain embodiments, may establish wireless communication with the first external electronic device 102a via the communication group having the first attribute. For example, when the establishing of the P2P group operation performed with the first external electronic device 102a is completed, the electronic device 101 that is a group owner may initiate the role of the group owner via an operating channel. For example, the electronic device 101 may transmit a beacon, like an AP. The first external electronic device 102a which is a group client may connect to the group owner and may perform a 4-way handshake operation based at least on the credential identified via the provisioning operation. When the 4-way handshake operation is completed, a Wi-Fi direct connection may be established between the electronic devices.

In operation 504, the electronic device 101 (e.g., the processor 120), according to certain embodiments, may change the attribute of the communication group to a second attribute. For example, the electronic device 101 maintains the connection (e.g., it does not terminate Wi-Fi direct connection with the first external electronic device 102a) and the P2P group of the persistent group. While the connection is maintained, the electronic device 101 may change the attribute of the P2P group from persistent group to a temporary group. For example, when the electronic device 101 acts as a group owner in the P2P group, the electronic device 101 may change the attribute of the P2P group.

According to certain embodiments, the electronic device 101 may change the persistent P2P group bit (of a group capability bitmap indicating P2P group capability) from a value of "1" to "0" so as to deactivate the persistent P2P group bit, may include the deactivated persistent P2P group bit information in a message, which is transmitted by the electronic device 101 group owner (e.g., a beacon frame, a probe response, or an association response), whereby the attribute of the entire P2P group is changed from the persistent group to the temporary group.

In operation 505, the electronic device 101 (e.g., the processor 120), according to certain embodiments, may identify a request for establishing wireless communication with a second external electronic device (e.g., the electronic device 102 of FIG. 1 or the second external electronic device 102b of FIG. 2). For example, the electronic device 101 may request establishment of wireless communication from the second external electronic device 102b, or may receive a request for establishing wireless communication from the second external electronic device 102b.

According to certain embodiments, while the electronic device 101 maintains the established P2P group, the electronic device 101 may perform a Wi-Fi direct discovery operation so as to discover at least one external electronic device that desires connection, and may invite the second external electronic device 102b by transmitting an invitation request message including the ID and attribute information of the current group to the second external electronic device 102b from among the at least one discovered external electronic device.

According to certain embodiments, while the establish P2P group is maintained, the electronic device 101 may receive a connection request from the second external electronic device 102b based on a Wi-Fi direct discovery operation performed by the second external electronic device 102b.

In operation 506, the electronic device 101 (e.g., the processor 120), according to certain embodiments, may establish wireless communication with the second external electronic device 102b using the communication group having the second attribute. For example, the electronic device 101 may perform a Wi-Fi direct connection with the second external electronic device 102b using the P2P group which has been changed from a persistent group to a temporary group.

According to certain embodiments, the electronic device 101 transmits an invitation request message including the ID and attribute information (e.g., information indicating that the P2P group is a temporary group) of the current group to the second external electronic device 102b. When an invitation response message that accepts the invitation is received from the second external electronic device 102b, a provisioning operation is performed in which the electronic device 101, operating as a group owner, and the second external electronic device 102b, operating as a group client, exchange credentials with each other. The electronic device 101 may reset the P2P group of the temporary group as a P2P group including the second external electronic device 102b, and the electronic device 101 and the second external electronic device 102b may connect Wi-Fi direct via the P2P group of the temporary group.

According to certain embodiments, when the electronic device 101 receives a connection request from the second external electronic device 102b, the electronic device 101 transmits a provision discovery response message including the ID and the attribute information (e.g., information indicating that the P2P group is a temporary group) of the current group to the second external electronic device 102b. A provisioning operation is performed in which the electronic device 101, operating as a group owner, and the second external electronic device 102b, operating as a group client, exchange credentials with each other. The electronic device 101 resets the P2P group of the temporary group as a P2P group including the second external electronic device 102b. The electronic device 101 and the second external electronic device 102b may connect Wi-Fi direct via the P2P group of the temporary group.

Figure 6A:
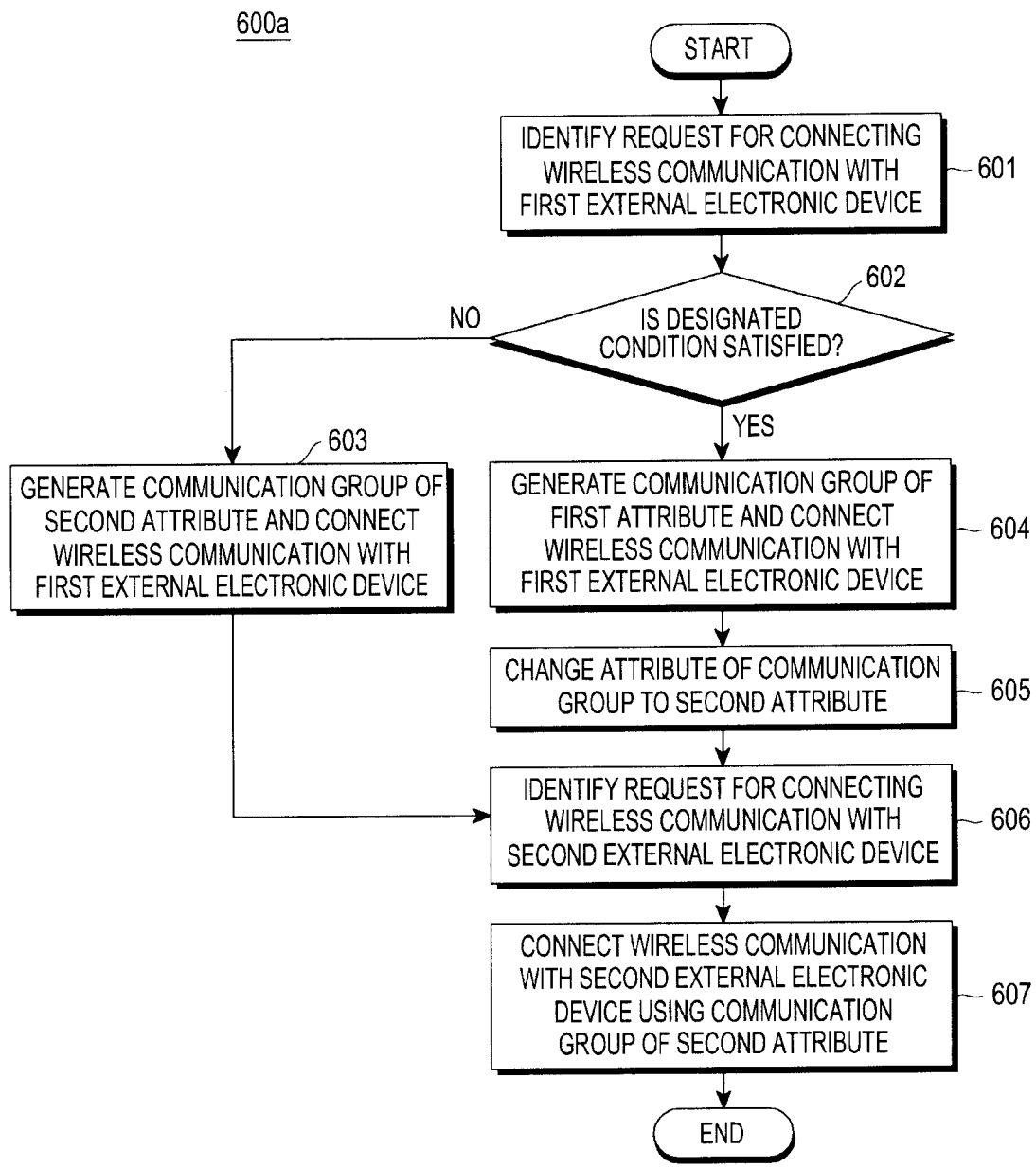
FIG. 6A is a flowchart illustrating an operation of connecting short range wireless communication by an electronic device according to certain embodiments.

FIG. 6A is a flowchart 600a illustrating an operation of connecting short range wireless communication by an electronic device according to certain embodiments.

According to certain embodiments, operations 601 to 607 may be executed via the electronic device 101 of FIG. 1 or FIG. 2 or the processor 120. The electronic device 101 may store, in a memory (e.g., the memory 130 of FIG. 1), instructions that enable operations 601 to 607 to be executed.

In operation 601, the electronic device 101 (e.g., the processor 120), according to certain embodiments, may identify a request for establishing wireless communication with the first external electronic device 102a. For example, the electronic device 101 may request the connection of wireless communication from the first external electronic device 102a, or may receive a request for establishing wireless communication from the first external electronic device 102a. The electronic device 101 may perform a Wi-Fi direct discovery operation based on the request from the electronic device 101 or the request from the first external electronic device 102a. The electronic device 101 may transmit a request for connecting to the first external electronic device 102a from among at least one external electronic device discovered in the Wi-Fi direct discovery operation, or may receive a connection request from the first external electronic device 102a.

In operation 602, the electronic device 101 (e.g., the processor 120), according to certain embodiments, may determine whether the request for establishing wireless communication with the first external electronic device 102a satisfies a designated condition. For example, the electronic device 101 identifies a request for establishing wireless communication with the first external electronic device 102a, and may determine whether the identified request satisfies the designated condition, so as to determine the attribute of the communication group for establishing wireless communication with the first external electronic device 102a, as one of a first attribute (e.g., a persistent group) and a second attribute (e.g., a temporary group). For example, in the case where a user has already a degree of established trust, where the Wi-Fi direct connection is frequently requested, where the electronic device 101 and the first external electronic device 102a belong to the same user, where the location if a trusted environment (e.g., home or office), where the Wi-Fi direct connection is utilized for a frequently used service or where a service that mandates utilization a persistent group (e.g., WSB function), the electronic device 101 may be to be used to establish the attribute of a communication group as a persistent group. Alternatively, in the case of a situation that a user does not have established trust, where the Wi-Fi direct connection is infrequently requested, where the first external electronic device 102a is a "guest" device, when the location is untrusted or unsecured (e.g., lobby or café), or where the Wi-Fi direct connection will be utilized for an infrequently utilized service, the electronic device 101 may be utilized to establish the attribute of the communication group as a temporary group. The designated condition may be set based on user's needs for the Wi-Fi direct connection.

According to certain embodiments, when the identified request is a state related to executing an application or a service associated with establishing wireless communication, the electronic device 101 may determine whether the designated condition is satisfied based on the type or attribute of the application or service. According to an embodiment, when the identified request is a state related to the operation attribute of an application or a service which is currently executed and is associated with establishing wireless communication, the electronic device 101 may determine whether the designated condition is satisfied based on the operation attribute of the application or service. For example, when a mirroring application, which performs mirroring the screen of the electronic device 101 (e.g., a smart phone) on the first external electronic device 102a (e.g., a TV), is executed, or when a WSB service function is activated, the electronic device 101 may determine that the designated condition for designating the attribute of the communication group for establishing wireless communication as a first attribute (e.g., a persistent group) is satisfied. According to another embodiment, when an application or a service for sharing a file of the electronic device 101 (e.g., a smart phone) with the first external electronic device 102a (e.g., a smart phone) is executed, or when a file sharing function of a currently executed application or service is activated, the electronic device 101 may determine that the designated condition for designating the attribute of the communication group for wireless communication connection as the first attribute is not satisfied. The first attribute of the communication group may include a persistent group defined in the Wi-Fi direct protocol.

According to certain embodiments, when the identified request is a message which is associated with establishing wireless communication and is received from the first external electronic device 102a, the electronic device 101 may determine whether the designated condition is satisfied based on the received message. For example, the electronic device 101 may exchange, with the first external electronic device 102a, a message defined in the Wi-Fi direct protocol (e.g., a probe request or a probe response), and the message may include at least one from among a Wi-Fi display information element (WFD IE), a peer to peer information element (P2P IE), and a Wi-Fi simple configuration information element (WSC IE). For example, the electronic device 101 may determine the type and the attribute of an application or a service executed in the first external electronic device 102a, based on the WFD IE included in the message. When an application or a service for mirroring is executed in the first external electronic device 102a, the Wi-Fi display standard may be used. The WFD IE may be included in the message received from the first external electronic device 102a. The electronic device 101 may identify the type and the attribute of the application or service executed in the first external electronic device 102a based on whether the WFD IE is included in the received message, and may determine whether the designated condition is satisfied based on the identified attribute of the application of the first external electronic device 102a. Alternatively, the electronic device 101 may determine the attribute of the service of the first external electronic device 102a based on the P2P IE included in the message. The P2P IE may include P2P attribute information indicating the attribute of the service (e.g., a WSB service, a print service, a play service, a transmission service, or a display service). The electronic device 101 may identify P2P attribute information from the P2P IE of the received message, and may determine whether the designated condition is satisfied based on the identified attribute of the service of the first external electronic device 102a. Alternatively, the electronic device 101 may determine the device type of the first external electronic device 102a based on the WSC IE included in the message. The WSC IE may include primary device type information. The electronic device 101 may identify the device type from the WSC IE of the received message, and may determine whether the designated condition is satisfied based on the identified device type of the first external electronic device 102a.

The electronic device 101 may proceed with operation 603 when the request for connecting the wireless communication with the first external electronic device 102a does not satisfy the designated condition, and may proceed with operation 604 when the request satisfies the designated condition.

In operation 603, when it is determined that the request for connecting the wireless communication with the first external electronic device 102a does not satisfy the designated condition, the electronic device 101 (e.g., the processor 120), according to certain embodiments, may establish a communication group having the second attribute (e.g., a temporary group) together with the first external electronic device 102a, and may establish wireless communication with the first external electronic device 102a.

In operation 604, when it is determined that the request for connecting the wireless communication with the first external electronic device 102a satisfies the designated condition, the electronic device 101 (e.g., the processor 120), according to certain embodiments, may establish a communication group having the first attribute (e.g., a persistent group) together with the first external electronic device 102a, and may establish wireless communication with the first external electronic device 102a. When wireless communication is connected via the communication group of the persistent group, the electronic device 101 may store information associated with the communication group of the persistent group. The information associated with the communication group of the persistent group may include the credentials (an authentication type, an encryption type, a network key, or an SSID) and the roles (e.g., one of a group owner and a group client) of the electronic device 101 and the first external electronic device 102a which belong to the established communication group. Also, the information associated with the communication group may be equally stored in the first external electronic device 102a.

In operation 605, the electronic device 101 (e.g., the processor 120), according to certain embodiments, may change the attribute of the communication group from the first attribute to the second attribute. For example, when the electronic device 101 acts as a group owner in the communication group that the electronic device 101 establishes together with the first external electronic device 102a, the electronic device 101 is capable of changing the attribute of the communication group from the first attribute to the second attribute. For example, the electronic device 101 may change the persistent P2P group bit of a group capability bitmap indicating P2P group capability from 1 to 0 so as to deactivate the persistent P2P group bit, and may include the deactivated persistent P2P group bit information in a message, which is transmitted by the electronic device 101 operating as the group owner (e.g., a beacon frame, a probe response, or an association response), and may transmit the message, whereby the attribute of the communication group is changed from the first attribute to the second attribute.

In operation 606, the electronic device 101 (e.g., the processor 120), according to certain embodiments, may identify a request for establishing wireless communication with a second external electronic device (e.g., the electronic device 102 of FIG. 1 or the second external electronic device 102b of FIG. 2). For example, the electronic device 101 may request the connection of wireless communication from the second external electronic device 102b, or may receive a request for establishing wireless communication from the second external electronic device 102b. In the state in which the communication group that the electronic device 101 establishes together with the first external electronic device 102a is maintained, the electronic device 101 may perform a Wi-Fi direct discovery operation so as to discover at least one external electronic device that desires connection, and may invite the second external electronic device 102b by transmitting an invitation request message including the ID and attribute information of the current group (the communication group that the electronic device 101 establishes together with the first external electronic device 102a) to the second external electronic device 102b from among the at least one discovered external electronic device. According to another embodiment, in the state in which the established communication group is maintained, the electronic device 101 may receive a connection request from the second external electronic device 102b based on a Wi-Fi direct discovery operation performed by the second external electronic device 102b.

In operation 607, the electronic device 101 (e.g., the processor 120), according to certain embodiments, may establish wireless communication with the second external electronic device 102b using the communication group having the second attribute. For example, the electronic device 101 may perform Wi-Fi direct connection with the second external electronic device 102b using the P2P group which has been changed from the persistent group to the temporary group. According to certain embodiments, a provisioning operation is performed in which the electronic device 101, operating as a group owner, and the second external electronic device 102b, operating as a group client, exchange credentials with each other, the communication group having the second attribute is reset as a communication group including the second external electronic device 102b, and the electronic device 101 and the second external electronic device 102b establish wireless communication via the communication group having the second attribute.

Figure 6B:
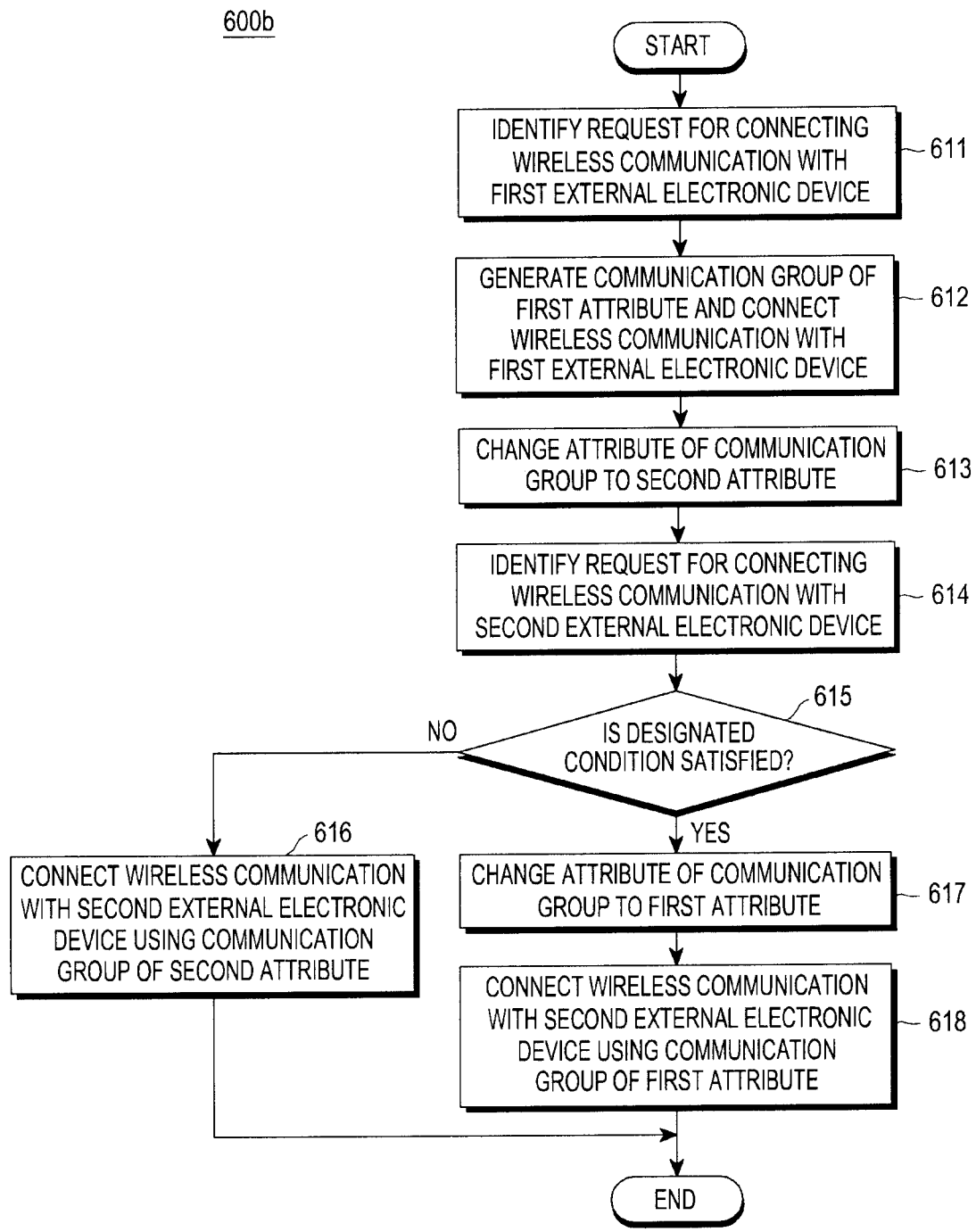
FIG. 6B is a flowchart illustrating an operation of connecting short range wireless communication by an electronic device according to certain embodiments.

FIG. 6B is a flowchart 600b illustrating an operation of connecting short range wireless communication by an electronic device according to certain embodiments.

According to certain embodiments, operations 611 to 618 may be executed via the electronic device 101 of FIG. 1 or FIG. 2 or the processor 120. The electronic device 101 may store, in a memory (e.g., the memory 130 of FIG. 1), instructions that enable operations 611 to 618 to be performed.

In operation 611, the electronic device 101 (e.g., the processor 120), according to certain embodiments, may identify a request for establishing wireless communication with the first external electronic device 102a. For example, the electronic device 101 may request the connection of wireless communication from the first external electronic device 102a, or may receive a request for establishing wireless communication from the first external electronic device 102a.

In operation 612, the electronic device 101 (e.g., the processor 120), according to certain embodiments, may establish a communication group having a first attribute (e.g., a persistent group) together with the first external electronic device 102a, and may establish wireless communication with the first external electronic device 102a. When wireless communication is connected via the communication group of the persistent group, the electronic device 101 may store information associated with the communication group of the persistent group. The information associated with the communication group of the persistent group may include the credentials (an authentication type, an encryption type, a network key, or an SSID) and the roles (e.g., one of a group owner and a group client) of the electronic device 101 and the first external electronic device 102a which belong to the established communication group. Also, the information associated with the communication group may be equally stored in the first external electronic device 102a.

In operation 613, the electronic device 101 (e.g., the processor 120), according to certain embodiments, may change the attribute of the communication group from the first attribute to a second attribute. For example, when the electronic device 101 acts as a group owner in the communication group that the electronic device 101 establishes together with the first external electronic device 102a, the electronic device 101 is capable of changing the attribute of the communication group from the first attribute to the second attribute. For example, the electronic device 101 may change the persistent P2P group bit of a group capability bitmap indicating P2P group capability from 1 to 0 so as to deactivate the persistent P2P group bit, may include the deactivated persistent P2P group bit information in a message, which is transmitted by the electronic device 101 operating as the group owner (e.g., a beacon frame, a probe response, or an association response), and may transmit the message, whereby the attribute of the communication group is changed from the first attribute to the second attribute.

In operation 614, the electronic device 101 (e.g., the processor 120), according to certain embodiments, may identify a request for establishing wireless communication with a second external electronic device (e.g., the electronic device 102 of FIG. 1 or the second external electronic device 102b of FIG. 2). For example, the electronic device 101 may request the connection of wireless communication from the second external electronic device 102b, or may receive a request for establishing wireless communication from the second external electronic device 102b. In the state in which the communication group that the electronic device 101 establishes together with the first external electronic device 102a is maintained, the electronic device 101 performs a Wi-Fi direct discovery operation so as to discover at least one external electronic device that desires connection, and may invite the second external electronic device 102b by transmitting an invitation request message including the ID and attribute information of the current group (the communication group that the electronic device 101 establishes together with the first external electronic device 102a) to the second external electronic device 102b from among the at least one discovered external electronic device. According to another embodiment, in the state in which the established communication group is maintained, the electronic device 101 may receive a connection request from the second external electronic device 102b based on a Wi-Fi direct discovery operation performed by the second external electronic device 102b.

In operation 615, the electronic device 101 (e.g., the processor 120), according to certain embodiments, may determine whether the request for establishing wireless communication with the second external electronic device 102b satisfies a designated condition. For example, the electronic device 101 identifies the request for establishing wireless communication with the second external electronic device 102b, and may determine whether the identified request satisfies the designated condition so as to determine whether to maintain the attribute of the communication group for establishing wireless communication with the second external electronic device 102b, or to change the attribute to one of the first attribute (e.g., a persistent group) or the second attribute (e.g., a temporary group). For example, in the case where a user has already a degree of established trust, where the Wi-Fi direct connection is frequently requested, where the electronic device 101 and the first external electronic device 102a belong to the same user, where the location if a trusted environment (e.g., home or office), where the Wi-Fi direct connection is utilized for a frequently used service or where a service that mandates utilization a persistent group (e.g., WSB function), the electronic device 101 may be to be used to establish the attribute of a communication group as a persistent group. Alternatively, in the case of a situation that a user does not have established trust, where the Wi-Fi direct connection is infrequently requested, where the first external electronic device 102a is a "guest" device, when the location is untrusted or unsecured (e.g., lobby or café), or where the Wi-Fi direct connection will be utilized for an infrequently utilized service, the electronic device 101 may be utilized to establish the attribute of the communication group as a temporary group. The designated condition may be set based on user's needs for the particular Wi-Fi direct connection.

According to certain embodiments, when the identified request is a state related to executing an application or a service associated with establishing wireless communication, the electronic device 101 may determine whether the identified request satisfies the designated condition based on the type or attribute of the application or service. According to an embodiment, when the identified request is a state related to the operation attribute of an application or a service which is currently executed and is associated with establishing wireless communication, the electronic device 101 may determine whether the identified request satisfies the designated condition based on the operation attribute of the application or service. For example, when a mirroring application, which performs mirroring the screen of the electronic device 101 (e.g., a smart phone) on the second external electronic device 102b (e.g., a TV), is executed, or when a WSB service function is activated, the electronic device 101 may determine that the designated condition for designating the attribute of the communication group for establishing wireless communication as the first attribute (e.g., a persistent group) is satisfied. According to another embodiment, when an application or a service for sharing a file of the electronic device 101 (e.g., a smart phone) with the second external electronic device 102b (e.g., a smart phone) is executed, or when a file sharing function of a currently executed application or service is activated, the electronic device 101 may determine that the designated condition for designating the attribute of the communication group for wireless communication connection as the first attribute is not satisfied.

According to certain embodiments, when the identified request is a message which is associated with establishing wireless communication and is received from the second external electronic device 102b, the electronic device 101 may determine whether the designated condition is satisfied based on the received message. For example, the electronic device 101 may exchange, with the second external electronic device 102b, a message defined in the Wi-Fi direct protocol (e.g., a probe request or a probe response), and the message may include at least one from among a Wi-Fi display information element (WFD IE), a peer to peer information element (P2P IE), and a Wi-Fi simple configuration information element (WSC IE). For example, the electronic device 101 may determine the type and the attribute of an application or a service executed in the second external electronic device 102b, based on the WFD IE included in the message. When an application or a service for mirroring is executed in the second external electronic device 102b, the Wi-Fi display standard may be used. The WFD IE may be included in the message received from the second external electronic device 102b. The electronic device 101 may identify the type and the attribute of the application or service executed in the second external electronic device 102b based on whether the WFD IE is included in the received message, and may determine whether the designated condition is satisfied based on the identified attribute of the application of the second external electronic device 102b. Alternatively, the electronic device 101 may determine the attribute of the service of the second external electronic device 102b based on the P2P IE included in the message. The P2P IE may include P2P attribute information indicating the attribute of the service (e.g., a WSB service, a print service, a play service, a transmission service, or a display service). The electronic device 101 may identify P2P attribute information from the P2P IE of the received message, and may determine whether the designated condition is satisfied based on the identified attribute of the service of the second external electronic device 102b. Alternatively, the electronic device 101 may determine the device type of the second external electronic device 102b based on the WSC IE included in the message. The WSC IE may include primary device type information. The electronic device 101 may identify the device type from the WSC IE of the received message, and may determine whether the designated condition is satisfied based on the identified device type of the second external electronic device 102b.

The electronic device 101 may proceed with operation 616 when the request for connecting the wireless communication with the second external electronic device 102b does not satisfy the designated condition, and may proceed with operation 617 when the request satisfies the designated condition.

In operation 616, when it is determined that the request for connecting the wireless communication with the second external electronic device 102b does not satisfy the designated condition, the electronic device 101 (e.g., the processor 120), according to certain embodiments, may maintain the attribute of the communication group as the second attribute (e.g., a temporary group), and may establish wireless communication with the second external electronic device 102b using the communication group with the second attribute. For example, the electronic device 101 may set the persistent P2P group bit of the group capability bitmap indicating P2P group capability to 0 so as to deactivate the persistent P2P group bit, may include the deactivated persistent P2P group bit information of 0 in a message which is transmitted by the electronic device 101 operating as the group owner (e.g., a beacon frame, a probe response, or an association response), and may transmit the message, whereby the attribute of the communication group may be maintained as the temporary group.

According to certain embodiments, a provisioning operation is performed in which the electronic device 101, operating as a group owner, and the second external electronic device 102b, operating as a group client, exchange credentials with each other, the current communication group is reset as a communication group including the second external electronic device 102b, and the electronic device 101 and the second external electronic device 102b establish wireless communication via the communication group having the second attribute.

In operation 617, when it is determined that the request for connecting the wireless communication with the second external electronic device 102b satisfies the designated condition, the electronic device 101 (e.g., the processor 120), according to certain embodiments, may change the attribute of the communication group from the second attribute (e.g., a temporary group) the first attribute (e.g., a persistent group). For example, the electronic device 101 may change the persistent P2P group bit of the group capability bitmap indicating P2P group capability from 0 to 1 so as to activate the persistent P2P group bit, may include the activated persistent P2P group bit information of 1 in a message which is transmitted by the electronic device 101 operating as the group owner (e.g., a beacon frame, a probe response, or an association response), and may transmit the message, whereby the attribute of the communication group may be changed from the temporary group to the persistent group.

In operation 618, the electronic device 101 (e.g., the processor 120), according to certain embodiments, may establish wireless communication with the second external electronic device 102b using the communication group having the first attribute.

According to certain embodiments, a provisioning operation is performed in which the electronic device 101, operating as a group owner, and the second external electronic device 102b, operating as a group client, exchange credentials with each other, the current communication group is reset as a communication group including the second external electronic device 102b, and the electronic device 101 and the second external electronic device 102b establish wireless communication via the communication group having the first attribute. When wireless communication is connected via the communication group of the persistent group, the electronic device 101 may store information associated with the communication group of the persistent group. The information associated with the communication group of the persistent group may include the credentials (an authentication type, an encryption type, a network key, or an SSID) and the roles (e.g., one of a group owner and a group client) of the electronic device 101 and the second external electronic device 102b which belong to the established communication group. Also, the information associated with the communication group may be equally stored in the second external electronic device 102b.

Figure 7:
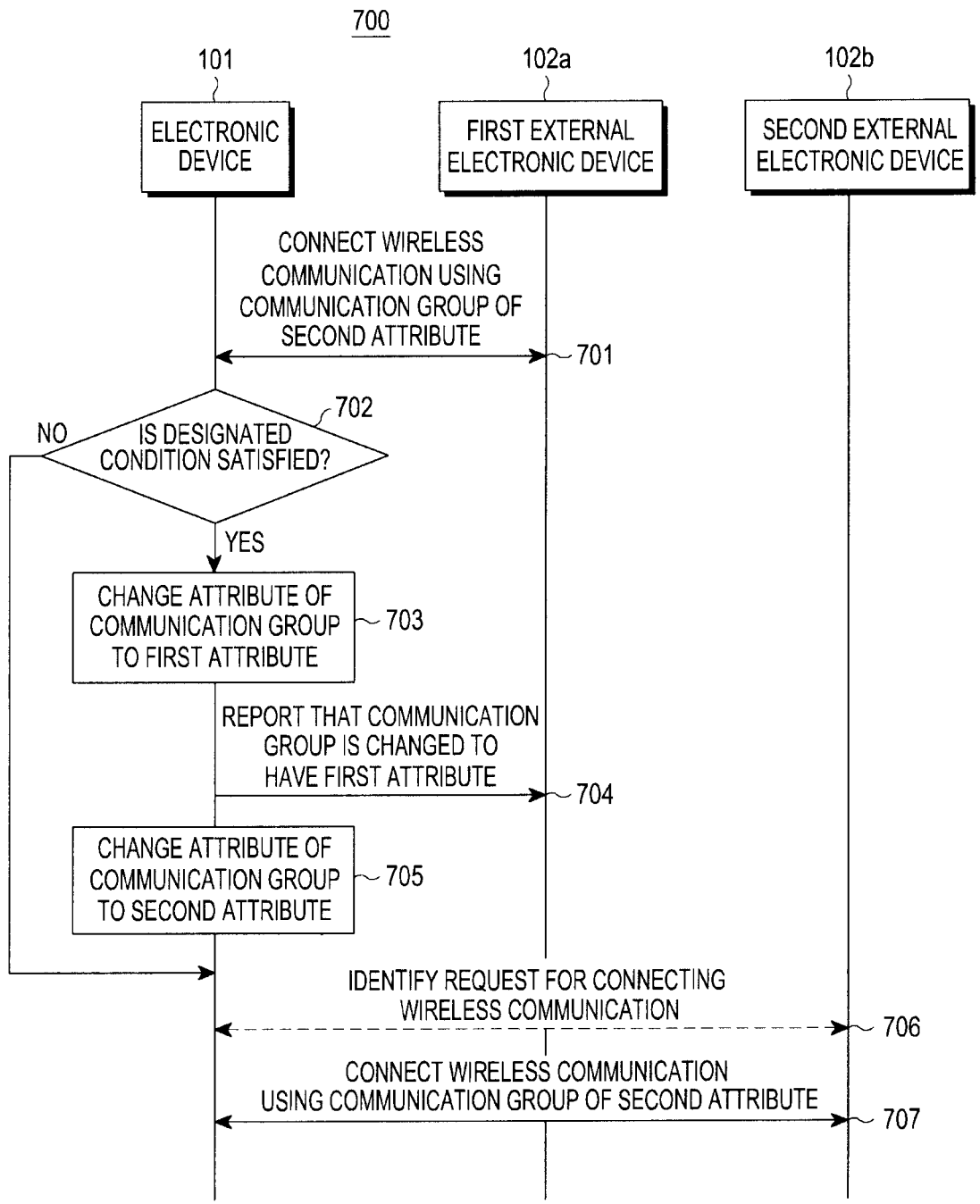
FIG. 7 is a flowchart illustrating an operation of connecting short range wireless communication by an electronic device and external electronic devices according to certain embodiments.

FIG. 7 is a flowchart 700 illustrating an operation of connecting short range wireless communication by an electronic device and external electronic devices according to certain embodiments.

According to certain embodiments, operations 701 to 707 may be executed via the electronic device 101 of FIG. 1 or FIG. 2 or the processor 120. The electronic device 101 may store, in a memory (e.g., the memory 130 of FIG. 1), instructions that enable operations 701 to 707 to be executed. Also, operations 701 to 707 describe operations performed when the electronic device 101 establishes a communication group having a second attribute together with the first external electronic device 102a and connects wireless communication in operation 603 of FIG. 6A.

In operation 701, the electronic device 101 (e.g., the processor 120), according to certain embodiments, may establish wireless communication with the first external electronic device 102a using the communication group having the second attribute. For example, the communication group having the second attribute may include a temporary group defined in the Wi-Fi direct protocol. For example, in the case of a situation that a user does not trust in or in a case in which Wi-Fi direct connection is infrequently requested, such as when the first external electronic device 102a is a temporary visitor's device, when a place is a place that a user may not trust (e.g., lobby or café), or when Wi-Fi direct connection is for a service that a user infrequently uses, the electronic device 101 may establish the attribute of the communication group as a temporary group, and may establish wireless communication. According to another embodiment, when the electronic device 101 establish wireless communication based on a default setting, the electronic device 101 may be configured to establish the attribute of the communication group as a temporary group, and to establish wireless communication via the communication group of the temporary group.

In operation 702, the electronic device 101 (e.g., the processor 120), according to certain embodiments, may determine whether a designated condition for changing the attribute of the communication group that the electronic device 101 establishes with the first external electronic device 102a is satisfied. For example, the electronic device 101 may identify a request for establishing wireless communication with the first external electronic device 102a, and may determine whether the identified request satisfies the designated condition, so as to determine whether to maintain the attribute of the communication group for establishing wireless communication with the first external electronic device 102a as the second attribute (e.g., a temporary group), or to change the attribute of the communication group to a first attribute (e.g., a persistent group). For example, in the case where a user has already a degree of established trust, where the Wi-Fi direct connection is frequently requested, where the electronic device 101 and the first external electronic device 102a belong to the same user, where the location if a trusted environment (e.g., home or office), where the Wi-Fi direct connection is utilized for a frequently used service or where a service that mandates utilization a persistent group (e.g., WSB function), the electronic device 101 may be to be used to establish the attribute of a communication group as a persistent group. The designated condition may be set based on user's needs for the Wi-Fi direct connection.

According to certain embodiments, the electronic device 101 may determine whether the designated condition is satisfied based on the state of the electronic device 101 or a message transmitted to the first external electronic device 102a in association with Wi-Fi direct connection.

According to certain embodiments, the electronic device 101 may receive a message associated with Wi-Fi direct connection from the first external electronic device 102a, and may determine whether the designated condition is satisfied based on the received message.

When the designated condition is satisfied, the electronic device 101 may proceed with operation 703. When the designated condition is not satisfied, the electronic device 101 may maintain Wi-Fi direct connection using the communication group having the second attribute of the electronic device 101 and the first external electronic device 102a.

In operation 703, the electronic device 101 (e.g., the processor 120), according to certain embodiments, may change the attribute of the communication group from the second attribute (e.g., a temporary group) to the first attribute (e.g., a persistent group). For example, when the electronic device 101 operates as a group owner in the communication group that the electronic device 101 establishes together with the first external electronic device 102a, the electronic device 101 is capable of changing the attribute of the communication group from the second attribute to the first attribute. The electronic device 101 may change the attribute of the communication group from the second attribute to the first attribute in the state in which the electronic device 101 does not terminate the Wi-Fi direct connection with the first external electronic device 102a and may maintain the communication group. For example, the electronic device 101 may change the persistent P2P group bit of a group capability bitmap indicating P2P group capability from 0 to 1, so as to activate the persistent P2P group bit, may include the activated persistent P2P group bit information in a message, which is transmitted by the electronic device 101 operating as the group owner (e.g., a beacon frame, a probe response, or an association response), and may transmit the message, whereby the attribute of the communication group is changed from the second attribute to the first attribute. When the attribute of the communication group is changed from the second attribute to the first attribute, the electronic device 101 may store a credential (e.g., an authentication type, an encryption type, a network key, or an SSID) and a role (one of a group owner and a group client), as information associated with the communication group having the first attribute (e.g., a persistent group).

In operation 704, the electronic device 101 (e.g., the processor 120), according to certain embodiments, may inform the first external electronic device 102a that the attribute of the communication group is changed from the second attribute to the first attribute via a message. For example, the notification message indicating that the attribute of the communication group for establishing wireless communication is changed from the second attribute to the first attribute may be transmitted to the first external electronic device 102a in a unicast manner. When the first external electronic device 102a receives the message indicating that the attribute of the communication group is changed to the first attribute, the first external electronic device 102a may store a credential (e.g., an authentication type, an encryption type, a network key, or an SSID) and a role (one of a group owner and a group client), as information associated with the communication group having the first attribute (e.g., a persistent group).

In operation 705, the electronic device 101 (e.g., the processor 120), according to certain embodiments, may change the attribute of the communication group from the first attribute to the second attribute. For example, when the electronic device 101 operates as a group owner in the communication group that the electronic device 101 establishes together with the first external electronic device 102a, the electronic device 101 is capable of changing the attribute of the P2P group. The electronic device 101 may change the attribute of the communication group from the first attribute (e.g., a persistent group) to the second attribute (e.g., a temporary group) in the state in which the electronic device 101 does not terminate the Wi-Fi direct connection with the first external electronic device 102a and may maintain the communication group. For example, the electronic device 101 may change the persistent P2P group bit of a group capability bitmap indicating P2P group capability from 1 to 0 so as to deactivate the persistent P2P group bit, may include the deactivated persistent P2P group bit information in a message, which is transmitted by the electronic device 101 operating as the group owner (e.g., a beacon frame, a probe response, or an association response), and may transmit the message, whereby the attribute of the P2P group may be changed from a persistent group to a temporary group.

In operation 706, the electronic device 101 (e.g., the processor 120), according to certain embodiments, may identify a request for establishing wireless communication with the second external electronic device 102b. For example, the electronic device 101 may request the connection of wireless communication from the second external electronic device 102b, or may receive a request for establishing wireless communication from the second external electronic device 102b. According to an embodiment, in the state in which the electronic device 101 maintains the established communication group, the electronic device 101 performs a Wi-Fi direct discovery operation so as to discover at least one external electronic device that desires connection, and may invite the second external electronic device 102b by transmitting an invitation request message including the ID and attribute information of the current group to the second external electronic device 102b from among the at least one discovered external electronic device. According to another embodiment, in the state in which the established communication group is maintained, the electronic device 101 may receive a connection request from the second external electronic device 102b based on a Wi-Fi direct discovery operation performed by the second external electronic device 102b.

In operation 707, the electronic device 101 may connect Wi-Fi direct with the second external electronic device 102b, using the P2P group having the second attribute. The electronic device 101 (e.g., the processor 120), according to certain embodiments, may establish wireless communication with the second external electronic device 102b using the communication group having the second attribute. For example, a provisioning operation is performed in which the electronic device 101, operating as a group owner, and the second external electronic device 102b, operating as a group client, exchange credentials with each other, the current communication group is reset as a communication group including the second external electronic device 102b, and the electronic device 101 and the second external electronic device 102b establish wireless communication via the communication group having the second attribute (e.g., a temporary group).

Figure 8:
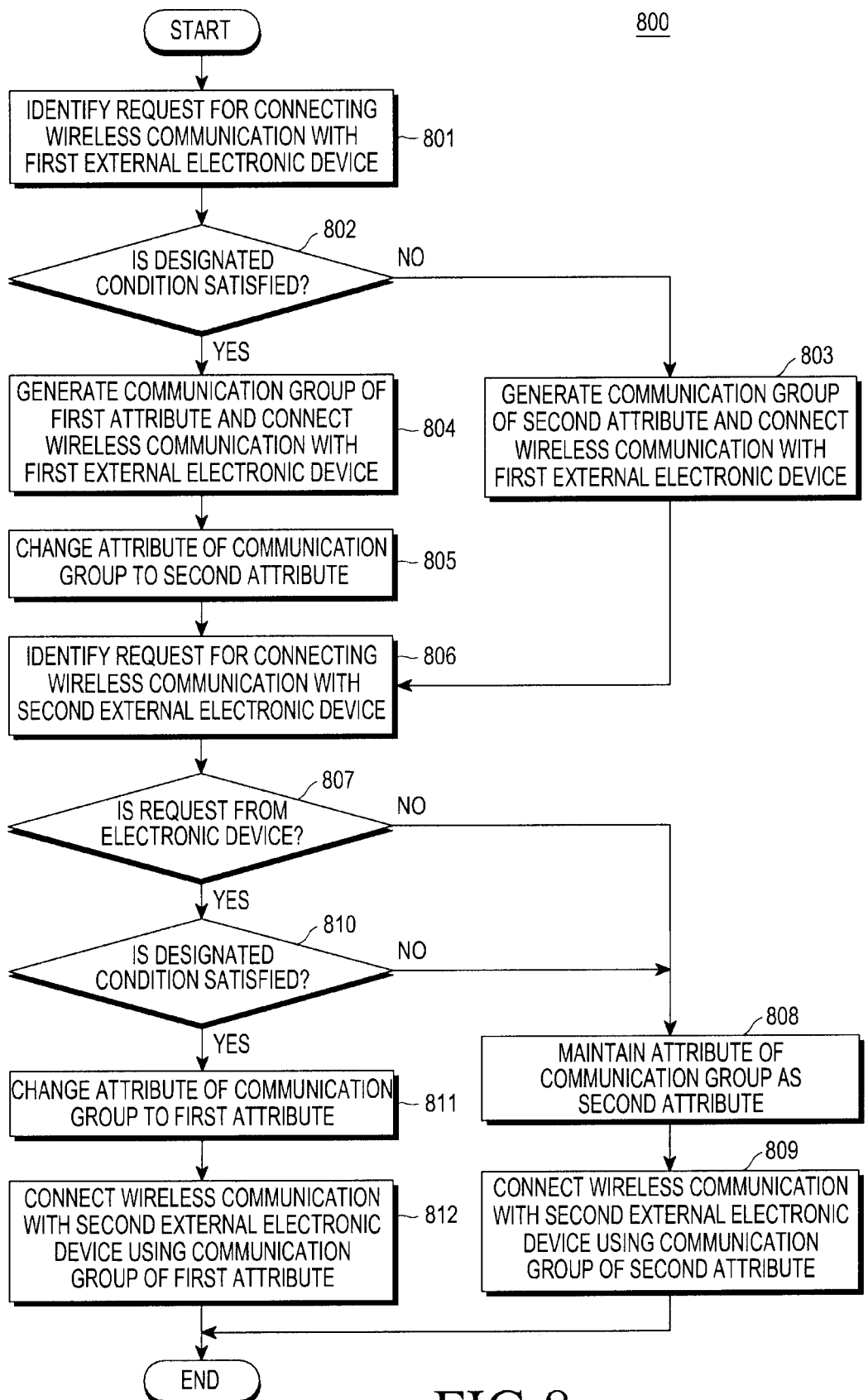
FIG. 8 is a flowchart illustrating an operation of connecting short range wireless communication by an electronic device according to certain embodiments.

FIG. 8 is a flowchart 800 illustrating an operation of connecting short range wireless communication by an electronic device according to certain embodiments.

According to certain embodiments, operations 801 to 812 may be executed via the electronic device 101 of FIG. 1 or FIG. 2 or the processor 120. The electronic device 101 may store, in a memory (e.g., the memory 130 of FIG. 1), instructions that enable operations 801 to 812 to be executed.

In operation 801, the electronic device 101 (e.g., the processor 120), according to certain embodiments, may perform an operation for establishing wireless communication in response to a request from the electronic device 101 or a request from the first external electronic device 102a. For example, the electronic device 101 may transmit a request for connecting to the first external electronic device 102a from among at least one external electronic device discovered in a Wi-Fi direct discovery operation, or may receive a connection request from the first external electronic device 102a.

According to certain embodiments, the electronic device 101 may identify a request associated with wireless communication connection with the first external electronic device 102a, based on the state of the electronic device 101. For example, when an application or a service associated with wireless communication connection is executed by a user, the electronic device 101 may identify the request associated with the wireless communication connection. For example, the electronic device 101 may identify a request associated with wireless communication connection when a user executes an application or a service for outputting content (e.g., video or audio) or the screen of the electronic device 101 to the first external electronic device 102a, when a user executes an application or a service for sharing a file of the electronic device 101 with the first external electronic device 102a, or when a user executes an application or a service for a Wi-Fi serial bus (WSB). Alternatively, the electronic device 101 may identify a request associated with wireless communication connection based on the operation attribute of a currently executed application or service. For example, when the currently executed application or service activates a function that utilizes wireless communication connection, the electronic device 101 may identify a request associated with wireless communication connection.

According to certain embodiments, the electronic device 101 may identify a request associated with wireless communication connection with the first external electronic device 102a, based on a message received from the first external electronic device 102a. For example, the electronic device 101 may receive a connection request from the second external electronic device 102b via a Wi-Fi direct discovery operation performed with the second external electronic device 102b. The electronic device 101 may identify the request associated with wireless communication connection based on information included in the message received from the second external electronic device 102b.

In operation 802, the electronic device 101 (e.g., the processor 120), according to certain embodiments, may determine whether the identified request satisfies a designated condition. For example, the electronic device 101 identifies the request associated with wireless communication connection with the first external electronic device 102a, and may determine whether the identified request satisfies the designated condition, so as to determine the attribute of a communication group for wireless communication connection with the first external electronic device 102a, as one of a first attribute (e.g., a persistent group) and a second attribute (e.g., a temporary group).

According to certain embodiments, when the identified request is a state related to executing an application or a service associated with establishing wireless communication, the electronic device 101 may determine whether the designated condition is satisfied based on the type or attribute of the application or service. According to an embodiment, when the identified request is a state related to the operation attribute of an application or a service which is currently executed and is associated with establishing wireless communication, the electronic device 101 may determine whether the designated condition is satisfied based on the operation attribute of the application or service. For example, when a mirroring application, which performs mirroring the screen of the electronic device on an external electronic device (e.g., a TV), is executed, or when a WSB service function is activated, the electronic device 101 may determine that the designated condition for designating the attribute of the communication group for wireless communication connection as the first attribute (e.g., a persistent group) is satisfied. According to an embodiment, when an application or a service for sharing a file of the electronic device with an external electronic device (e.g., a smart phone) is executed, or when a file sharing function of a currently executed application or service is activated, the electronic device 101 may determine that the designated condition for designating the attribute of the communication group for wireless communication connection as the first attribute is not satisfied. The first attribute of the communication group may be a persistent group defined in the Wi-Fi direct protocol.

According to certain embodiments, when the identified request is a message which is associated with establishing wireless communication and is received from the first external electronic device 102a, the electronic device 101 may determine whether the designated condition is satisfied based on the received message. For example, the electronic device 101 may exchange, with the first external electronic device 102a, a message defined in the Wi-Fi direct protocol (e.g., a probe request or a probe response), and the message may include at least one from among a Wi-Fi display information element (WFD IE), a peer to peer information element (P2P IE), and a Wi-Fi simple configuration information element (WSC IE). For example, the electronic device 101 may determine the type and the attribute of an application or a service executed in the first external electronic device 102a, based on the WFD IE included in the message. When an application or a service for mirroring is executed in the first external electronic device 102a, the Wi-Fi display standard may be used. The WFD IE may be included in the message received from the first external electronic device 102a. The electronic device 101 may identify the type and the attribute of the application or service executed in the first external electronic device 102a based on whether the WFD IE is included in the received message, and may determine whether the designated condition is satisfied based on the identified attribute of the application of the first external electronic device 102a. Alternatively, the electronic device 101 may determine the attribute of the service of the first external electronic device 102a based on the P2P IE included in the message. The P2P IE may include P2P attribute information indicating the attribute of the service (e.g., a WSB service, a print service, a play service, a transmission service, or a display service).

The electronic device 101 may identify P2P attribute information from the P2P IE of the received message, and may determine whether the designated condition is satisfied based on the identified attribute of the service of the first external electronic device 102a. Alternatively, the electronic device 101 may determine the device type of the first external electronic device 102a based on the WSC IE included in the message. The WSC IE may include primary device type information. The electronic device 101 may identify the device type from the WSC IE of the received message, and may determine whether the designated condition is satisfied based on the identified device type of the first external electronic device 102a.

In operation 803, when it is determined that the request for connecting the wireless communication with the first external electronic device 102a does not satisfy the designated condition, the electronic device 101 (e.g., the processor 120), according to certain embodiments, may establish a communication group having a second attribute (e.g., a temporary group) together with the first external electronic device 102a, and may establish wireless communication.

In operation 804, when it is determined that the request for connecting the wireless communication with the first external electronic device 102a satisfies the designated condition, the electronic device 101 (e.g., the processor 120), according to certain embodiments, may establish a communication group having a first attribute (e.g., a persistent group) together with the first external electronic device 102a, and may establish wireless communication.

In operation 805, the electronic device 101 (e.g., the processor 120), according to certain embodiments, may change the attribute of the communication group from the first attribute to the second attribute. The electronic device 101 may change the attribute of the communication group from the first attribute to the second attribute in the state in which the communication group is maintained. For example, when the electronic device 101 acts as a group owner in the communication group that the electronic device 101 establishes together with the first external electronic device 102a, the electronic device 101 is capable of changing the attribute of the communication group from the first attribute to the second attribute. For example, the electronic device 101 may change the persistent P2P group bit of a group capability bitmap indicating P2P group capability from 1 to 0 so as to deactivate the persistent P2P group bit, may include the deactivated persistent P2P group bit information in a message, which is transmitted by the electronic device 101 operating as the group owner (e.g., a beacon frame, a probe response, or an association response), and may transmit the message, whereby the attribute of the communication group is changed from the first attribute to the second attribute.

In operation 806, the electronic device 101 (e.g., the processor 120), according to certain embodiments, may identify a request associated with wireless communication connection with a second external electronic device (e.g., the electronic device 102 of FIG. 1 or the second external electronic device 102b of FIG. 2).

In operation 807, the electronic device 101 (e.g., the processor 120), according to certain embodiments, may determine whether the identified request associated with wireless communication connection is a request from the electronic device 101 or a request by a message that is associated with wireless communication connection and is received from the second external electronic device 102b.

In operations 808, the electronic device 101 (e.g., the processor 120), according to certain embodiments, may maintain the attribute of the communication group as the second attribute (e.g., a temporary group) when the identified request associated with wireless communication connection is a message received from the second external electronic device 102*b*. For example, the electronic device 101 may set the persistent P2P group bit of the group capability bitmap indicating P2P group capability to 0, so as to deactivate the persistent P2P group bit, may include the deactivated persistent P2P group bit information in a message which is transmitted by the electronic device 101 operating as the group owner (e.g., a beacon frame, a probe response, or an association response), and may transmit the message, whereby the attribute of the communication group may be maintained as the second attribute.

In operation 809, the electronic device 101 (e.g., the processor 120), according to certain embodiments, may establish wireless communication with the second external electronic device 102*b* using the communication group having the second attribute. For example, the electronic device 101 may transmit a provision discovery response message including the ID and the attribute information (e.g., information indicating that the communication group has a second attribute) of the current group to the second external electronic device 102*b*. A provisioning operation is performed in which the electronic device 101, operating as a group owner, and the second external electronic device 102*b*, operating as a group client, exchange credentials with each other. The communication group having the second attribute is reset as a communication group including the second external electronic device 102*b*. The electronic device 101 and the second external electronic device 102*b* may establish wireless communication via the communication group having the second attribute. According to certain embodiments, after Wi-Fi direct connection is completed using a communication group having the first attribute or the second attribute, when a predetermined condition is satisfied, the electronic device 101 may change the attribute of the communication group to an attribute different from the current attribute. For example, while Wi-Fi direct is being connected using a temporary group, when a Wi-Fi serial bus (WSB) function is activated, the electronic device 101 may change the attribute of the Wi-Fi direct from a temporary group to a persistent group.

In operation 810, when the identified request associated with the wireless communication connection is a request from the electronic device 101, the electronic device 101 (e.g., the processor 120), according to certain embodiments, may determine whether the identified request satisfies a designated condition. For example, the electronic device 101 may determine whether the identified request satisfies the designated condition, so as to determine whether to maintain the attribute of the communication group for wireless communication connection with the second external electronic device 102*b*, or to change the attribute of the communication group to one of the first attribute and the second attribute.

According to certain embodiments, when the identified request is a state related to executing an application or a service associated with establishing wireless communication, the electronic device 101 may determine whether the identified request satisfies the designated condition based on the type or attribute of the application or service. According to an embodiment, when the identified request is a state related to the operation attribute of an application or a service which is currently executed and is associated with establishing wireless communication, the electronic device 101 may determine whether the identified request satisfies the designated condition based on the operation attribute of the application or service. For example, when a mirroring application, which performs mirroring the screen of the electronic device on an external electronic device (e.g., a TV), is executed, or when a WSB service function is activated, the electronic device 101 may determine that the designated condition for designating the attribute of the communication group for wireless communication connection as the first attribute (e.g., a persistent group) is satisfied. According to an embodiment, when an application or a service for sharing a file of the electronic device with an external electronic device (e.g., a smart phone) is executed, or when a file sharing function of a currently executed application or service is activated, the electronic device 101 may determine that the designated condition for designating the attribute of the communication group for wireless communication connection as the first attribute is not satisfied. The first attribute of the communication group may be a persistent group defined in the Wi-Fi direct protocol.

In operation 811, when it is determined that the request for connecting the wireless communication with the second external electronic device 102*b* satisfies the designated condition, the electronic device 101 (e.g., the processor 120), according to certain embodiments, may change the attribute of the communication group from the second attribute (e.g., a temporary group) the first attribute (e.g., a persistent group). For example, the electronic device 101 may change the persistent P2P group bit of the group capability bitmap indicating P2P group capability from 0 to 1 so as to activate the persistent P2P group bit, may include the activated persistent P2P group bit information in a message which is transmitted by the electronic device 101 operating as the group owner (e.g., a beacon frame, a probe response, or an association response), and may transmit the message, whereby the attribute of the communication group may be changed from the second attribute to the first attribute.

In operation 812, the electronic device 101 (e.g., the processor 120), according to certain embodiments, may establish wireless communication with the second external electronic device 102 using the communication group having the first attribute. For example, the electronic device 101 may transmit an invitation request message including the ID and attribute information (e.g., information indicating that the communication group has the first attribute) of the current group to the second external electronic device 102*b*. When an invitation response message that accepts the invitation is received from the second external electronic device 102*b*, a provisioning operation is performed in which the electronic device 101, operating as a group owner, and the second external electronic device 102*b*, operating as a group client, exchange credentials with each other. The communication group having the first attribute may be reset as a communication group including the second external electronic device 102*b*. The electronic device 101 and the second external electronic device 102*b* may establish wireless communication using the communication group having the first attribute. Alternatively, the electronic device 101 transmits a provision discovery response message including the ID and the attribute information (e.g., information indicating that the communication group has the first attribute) of the current group to the second external electronic device 102*b*. A provisioning operation is performed in which the electronic device 101, operating as a group owner, and the second external electronic device 102*b*, operating as a group client, exchange credentials with each other. The communication group having the first attribute is reset as a communication group including the second external electronic device 102*b*. The electronic device 101 and the second external electronic device 102b may establish wireless communication via the communication group having the first attribute. When it is determined that the communication group has the first attribute (e.g., a persistent group), the electronic device 101 may store information associated with the communication group. The information associated with the communication group may include the credentials (an authentication type, an encryption type, a network key, or an SSID) and the roles (e.g., one of a group owner and a group client) of the electronic device 101 and the second external electronic device 102b which belong to the communication group. Also, the information associated with the communication group may be equally stored in the second external electronic device 102b.

Figure 9:
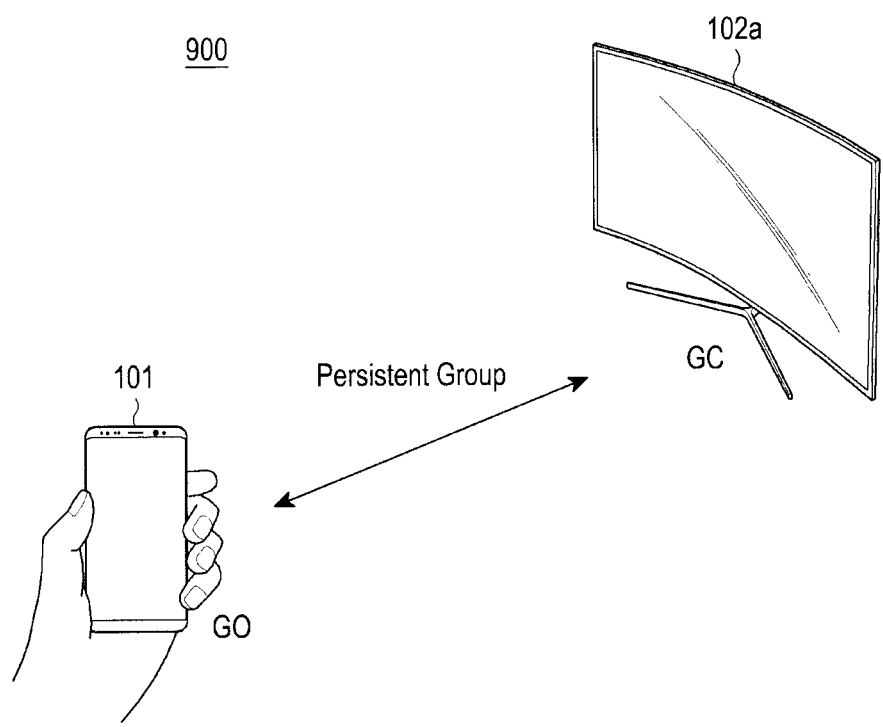
FIG. 9 is a diagram illustrating an example of connecting short range wireless communication by an electronic device and an external electronic device according to certain embodiments.

FIG. 9 is a diagram illustrating an example 900 of connecting short range wireless communication by an electronic device and an external electronic device according to certain embodiments.

Referring to FIG. 9, the electronic device 101 (e.g., a smart phone) and the first external electronic device 102a (e.g., TV) establish a P2P group, and connect Wi-Fi direct communication. For example, the electronic device 101 operates as a group owner and may provide a function of mirroring and displaying the screen of the electronic device 101 on the screen of the first external electronic device 102a that operates as a group client. In this scenario, the electronic device 101 and the first external electronic device 102a may establish the attribute of the P2P group as a persistent group, whereby the electronic device 101 and the first external electronic device 102a store the information associated with the established P2P group. Accordingly, they may omit group negotiation operation and a provisioning when performing reconnection, and thus, connection speed may be increased. For example, when the electronic device 101 and the first external electronic device 102a are devices belong to the same user, when they are situated in a trusted environment (e.g., home or office), or when a service performed is indicated as trusted, the electronic device 101 and the first external electronic device 102a may establish the P2P group as a persistent group.

Figure 10:
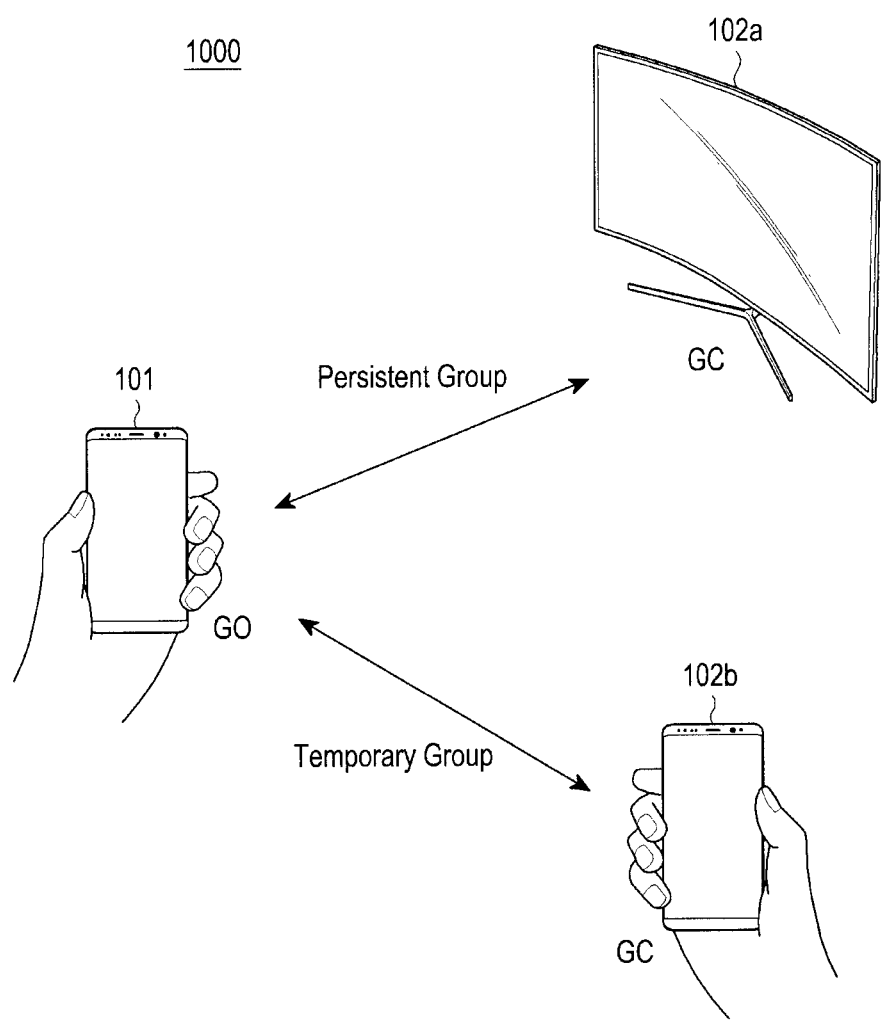
FIG. 10 is a diagram illustrating an example of connecting short range wireless communication by an electronic device and external electronic devices according to certain embodiments.

FIG. 10 is a diagram illustrating an example 1000 of connecting short range wireless communication by an electronic device and external electronic devices according to certain embodiments.

Referring to FIG. 10, the electronic device 101 (e.g., a smart phone) may establish a P2P group together with the first external electronic device 102a (e.g., TV) and the second external electronic device 102b (e.g., a smart phone) in a one-to-N match, and may connect Wi-Fi direct communication. For example, the electronic device 101 operates as a group owner and may provide mirroring of the screen of the electronic device 101, on the screen of the first external electronic device 102a operating as a group client. Also, the electronic device 101 may provide file sharing with the second external electronic device 102b operating as a group client. In this scenario, the electronic device 101 and the first external electronic device 102a may establish a persistent P2P group in order to quickly establish a connection when reconnection is performed. The electronic device 101 and the second external electronic device 102b may establish a temporary P2P group that temporarily maintains the P2P group. For example, when the electronic device 101 and the first external electronic device 102a are devices belonging to the same user, when the devices are disposed in a trusted environment (e.g., home or office), or when Wi-Fi direct connection is for a service that is frequently used, or a service that mandates utilization a persistent group (e.g., WSB function), the electronic device 101 may set the attribute of a P2P group to be "persistent". Alternatively, when the second external electronic device 102b is a guest device, when the location is unsecured or untrusted (e.g., lobby or café), or when Wi-Fi direct connection is for a service infrequently used, the electronic device 101 may generate the attribute of the P2P group as a temporary group. According to certain embodiments, the electronic device 101 may establish the P2P group as a persistent group together with the first external electronic device 102a, and may connect Wi-Fi direct. In the state in which the electronic device 101 maintain the P2P group of the persistent group that the electronic device 101 establishes together with the first external electronic device 102a, the electronic device 101 may change the attribute of the P2P group from the persistent group to the temporary group. When the second external electronic device 102b is added to the established P2P group in response to a request from the electronic device 101 or a request from the second external electronic device 102b, the electronic device 101 and the second external electronic device 102b may connect Wi-Fi direct based on the P2P group which is changed to the temporary group.

Figure 11:
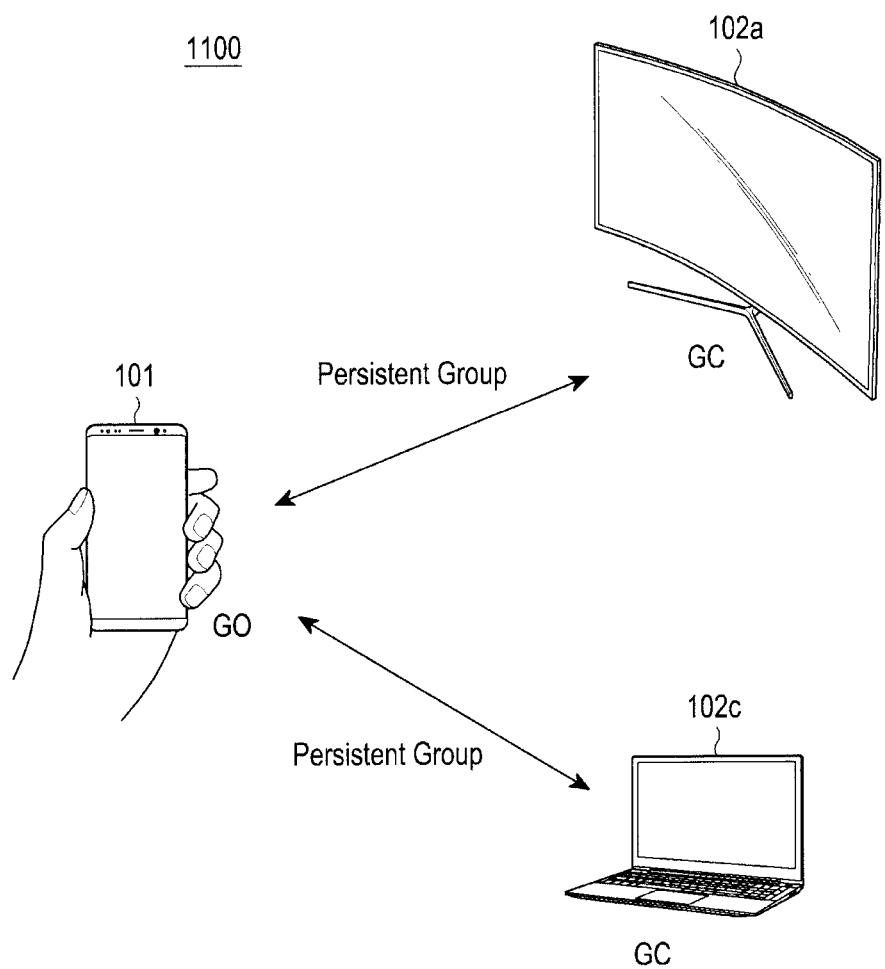
FIG. 11 is a diagram illustrating an example of connecting short range wireless communication by an electronic device and external electronic devices according to certain embodiments.

FIG. 11 is a diagram illustrating an example 1100 of connecting short range wireless communication by an electronic device and external electronic devices according to certain embodiments.

Referring to FIG. 11, the electronic device 101 (e.g., a smart phone) may establish a P2P group together with the first external electronic device 102a (e.g., TV) and a third external electronic device 102c (e.g., a notebook) in a one-to-N match, and may connect Wi-Fi direct communication. For example, the electronic device 101 operates as a group owner and may provide mirroring of the screen of the electronic device 101 on the screen of the first external electronic device 102a that operates as a group client. Also, the electronic device 101 may establish a Wi-Fi serial bus (WSB) connection with the third external electronic device 102c that operates as a group client. In this scenario, the electronic device 101 and the first external electronic device 102a may establish a persistent P2P group in order to quickly establish a connection when reconnection is performed. The electronic device 101 and the third external electronic device 102c may establish a P2P group of a persistent group according to the definition in the WSB standard.

According to certain embodiments, the electronic device 101 may establish the P2P group as a persistent group together with the first external electronic device 102a, and may connect Wi-Fi direct. In the state in which the electronic device 101 maintains the P2P group of the persistent, the electronic device 101 may change the attribute of the P2P group from persistent to temporary. According to an embodiment, when the third external electronic device 102c is added to the established P2P group, the electronic device 101 and the third external electronic device 102c identify a request associated with Wi-Fi direct connection, determine whether the identified request satisfies a designated condition, and thereby maintains or changes the attribute of the P2P group to one persistent group or temporary group, based on the determination. When the third external electronic device 102c is connected for the WSB function, the electronic device 101 changes the attribute of the P2P group from the temporary group to the persistent group again, and may reconnect Wi-Fi direct based on the persistent P2P group.

Figure 12:
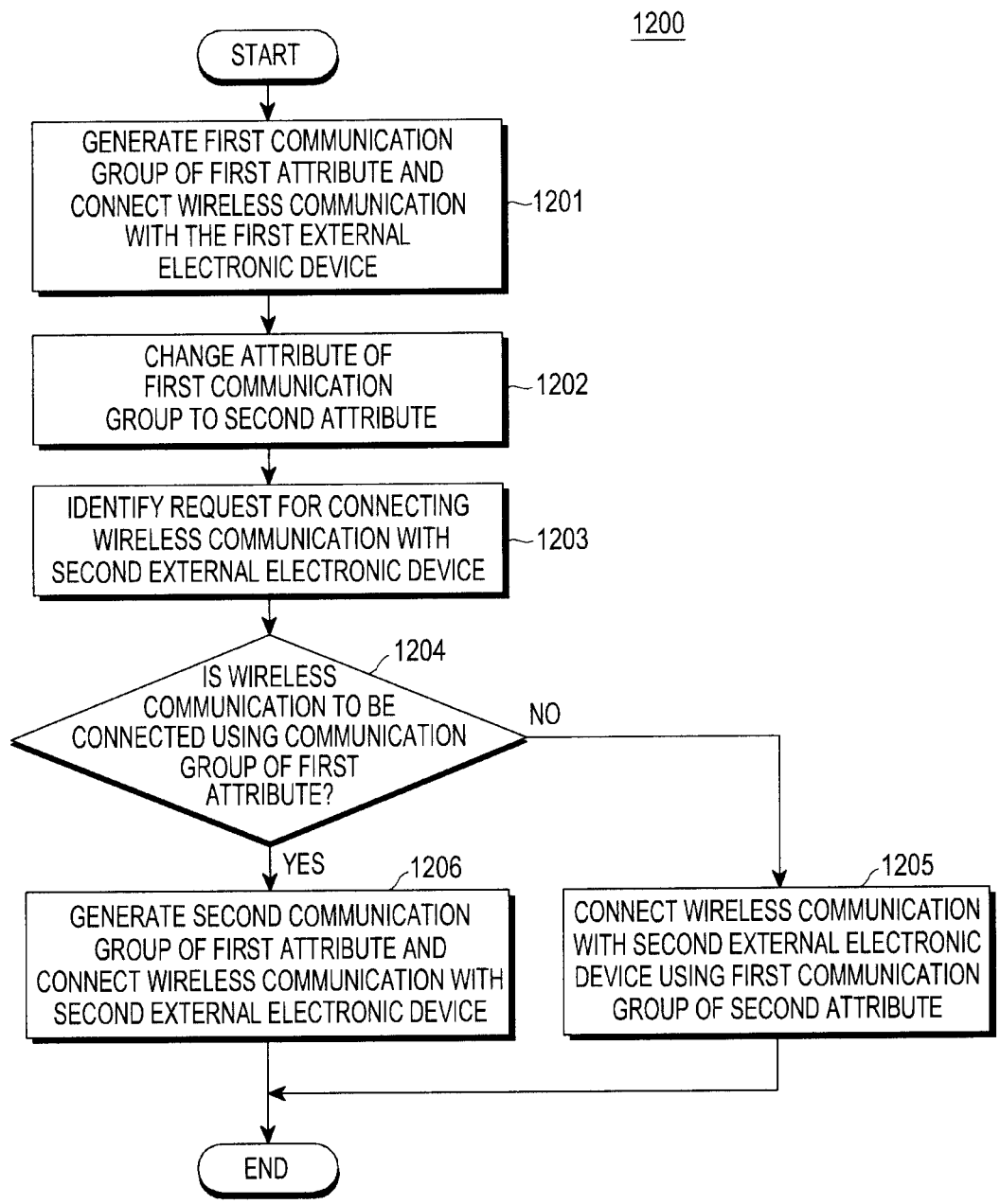
FIG. 12 is a flowchart illustrating an operation of connecting short range wireless communication by an electronic device according to certain embodiments.

FIG. 12 is a flowchart 1200 illustrating an operation of connecting short range wireless communication by an electronic device according to certain embodiments.

According to certain embodiments, operations 1201 to 1206 may be executed via the electronic device 101 of FIG. 1 or FIG. 2 or the processor 120. The electronic device 101 may store, in a memory (e.g., the memory 130 of FIG. 1), instructions for enabling operations 1201 to 1206 to be performed.

In operation 1201, the electronic device 101 (e.g., the processor 120), according to certain embodiments, may establish a first communication group having a first attribute together with a first external electronic device (e.g., the electronic device 102 of FIG. 1 or the first external electronic device 102a of FIG. 2), and may establish wireless communication. For example, the electronic device 101 may establish wireless communication with the first external electronic device 102a based on a Wi-Fi direct protocol via the communication module 190 (e.g., a wireless communication circuit). The communication module 190 of the electronic device 101 may provide wireless communication based on an infrastructure or a peer to peer (P2P) communication protocol. The infrastructure communication protocol may include a Wi-Fi protocol or IEEE 802.11, and the P2P communication protocol may include a Wi-Fi direct protocol. Also, the first communication group having the first attribute may include a persistent group defined in the Wi-Fi direct protocol. For example, in the case of a situation that a user may trust in or in a case in which Wi-Fi direct connection is frequently requested, such as when the electronic device 101 and the first external electronic device 102a are devices belonging to the same account user, when a place is a designated place that a user may trust (e.g., home or office), or when Wi-Fi direct connection is for a service that a user frequently uses or a service that utilizes a persistent group (e.g., a WSB function), the electronic device 101 may establish the attribute of the first communication group as the first attribute (e.g., a persistent group), and may establish wireless communication. The electronic device 101 may store information associated with the first communication group having the first attribute. The information associated with the first communication group may include credentials (e.g., an authentication type, an encryption type, a network key, or an SSID) and roles (e.g., one of a group owner or a group client) of the electronic device 101 and the first external electronic device 102a belonging to the first communication group. Also, the information associated with the first communication group may be equally stored in the first external electronic device 102a.

In operation 1202, the electronic device 101 (e.g., the processor 120), according to certain embodiments, may change the attribute of the first communication group that the electronic device 101 establishes together with the first external electronic device 102a, from the first attribute to the second attribute. In the state in which the first communication group is maintained, the electronic device 101 may change the attribute of the first communication group from the first attribute to the second attribute. For example, when the electronic device 101 operates as a group owner in the first communication group that the electronic device 101 establishes together with the first external electronic device 102a, the electronic device 101 is capable of changing the first attribute of the first communication group to the second attribute. For example, the first communication group having the second attribute may include a temporary group defined in the Wi-Fi direct protocol.

In operation 1203, the electronic device 101 (e.g., the processor 120), according to certain embodiments, may identify a request for establishing wireless communication with a second external electronic device (e.g., the electronic device 102 of FIG. 1 or the second external electronic device 102b of FIG. 2). For example, the electronic device 101 may request the connection of wireless communication from the second external electronic device 102b, or may receive a request for establishing wireless communication from the second external electronic device 102b.

In operation 1204, the electronic device 101 (e.g., the processor 120), according to certain embodiments, may determine whether wireless communication connection with the second external electronic device 102b using the communication group having the first attribute is to be used. For example, the electronic device 101 may identify a request for the connection of wireless communication with the second external electronic device 102b, and may determine whether the first attribute (e.g., a persistent group) or the second attribute (e.g., a temporary group) is to be used as the attribute of the communication group for establishing wireless communication with the second external electronic device 102b. For example where a user has established trust, where a Wi-Fi direct connection is frequently requested, where the electronic device 101 and the second external electronic device 102b belong to the same user, where the devices are connected in a trusted environment (e.g., home or office), where Wi-Fi direct connection is frequently used, or where a service mandates utilization of a persistent group (e.g., a WSB function), the electronic device 101 may determine that a persistent group is to be used as the attribute of the communication group.

The electronic device 101 may perform operation 1205 when the communication group having the first attribute for establishing wireless communication with the second external electronic device 102b is not to be used, and may perform operation 1206 when the communication group having the first attribute is to be used.

In operation 1205, the electronic device 101 (e.g., the processor 120), according to certain embodiments, may establish wireless communication with the second external electronic device 102b using the first communication group having a second attribute when the communication group having the first attribute is not to be used for connecting the wireless communication with the second external electronic device 102b. According to certain embodiments, a provisioning operation is performed in which the electronic device 101, operating as a group owner, and the second external electronic device 102b, operating as a group client, exchange credentials with each other, the first communication group having the second attribute is reset as a communication group including the second external electronic device 102b, and the electronic device 101 and the second external electronic device 102b establish wireless communication using the first communication group having the second attribute.

When the communication group having the first attribute is need for establishing wireless communication with the second external electronic device 102b, the electronic device 101 (e.g., the processor 120), according to certain embodiments, may establish a second communication group having the first attribute (e.g., a persistent group) together with the second external electronic device 102b, and may establish wireless communication with the second external electronic device 102b in operation 1206. In this instance, the electronic device 101 may establish wireless communication with the first external electronic device 102a using the first communication group having the second attribute, and may establish wireless communication with the second external electronic device 102b using the second communication group having the first attribute.

An electronic device (e.g., the electronic device 101 of FIG. 1), according to certain embodiments, may include: at least one communication circuit (e.g., the communication module 190 of FIG. 1) configured to provide wireless communication (e.g., the short range wireless communication network 198 of FIG. 1) based on a Wi-Fi direct protocol; a processor (e.g., the processor 120 of FIG. 1) operatively connected to the at least one communication circuit 190; and a memory (e.g., the memory 130 of FIG. 1) operatively connected to the processor 120, such that the memory 130 stores instructions, and when the instructions are executed, the instructions are configured to enable the processor 120 to perform: establishing a communication group having a first attribute with a first external electronic device (e.g., the electronic device 102 of FIG. 1 or the first external electronic device 102a of FIG. 2) via the at least one communication circuit 190, and establishing wireless communication to the first external electronic device 102a; changing the attribute of the communication group from the first attribute to a second attribute in the state in which the communication group is maintained; and when the connection of wireless communication with a second external electronic device (e.g., the electronic device 102 of FIG. 1 or the second external electronic device 102b of FIG. 2) via the communication group is requested, connecting the wireless communication with the second external electronic device 102b using the communication group having the second attribute. According to the electronic device 101 of certain embodiments, the first attribute of the communication group is associated with a persistent group defined in the Wi-Fi direct protocol, and the second attribute of the communication group is associated with a temporary group defined in the Wi-Fi direct protocol.

According to the electronic device 101 of certain embodiments, the electronic device 101 may be a group owner defined in the Wi-Fi direct protocol, and the first external electronic device 102a or the second external electronic device 102b may be a group client defined in the Wi-Fi direct protocol.

According to the electronic device 101 of certain embodiments, the instructions may enable the processor 120 to establish the communication group having the first attribute, and to store information associated with the communication group having the first attribute in the memory 130.

According to the electronic device 101 of certain embodiments, the information associated with the communication group having the first attribute may include at least one piece of information from among information associated with roles of the electronic device 101 and the first external electronic device 102a belonging to the communication group, and information associated with a credential of the established communication group.

According to the electronic device 101 of certain embodiments, the instructions enable the processor 120 to establish the communication group having the first attribute, and to transmit a message indicating that the communication group has the first attribute to the first external electronic device 102a via the at least one communication circuit 190.

An electronic device (e.g., the electronic device 101 of FIG. 1), according to certain embodiments, may include: at least one communication circuit (e.g., the communication module 190 of FIG. 1) configured to provide wireless communication (e.g., the short range wireless communication network 198 of FIG. 1) based on a Wi-Fi direct protocol; a processor (e.g., the processor 120 of FIG. 1) operatively connected to the at least one communication circuit 190; and a memory (e.g., the memory 130 of FIG. 1) operatively connected to the processor 120, such that the memory 130 may include instructions, and when the instructions are executed, the instructions are configured to enable the processor 120 to perform: designating an attribute of a communication group with the first external electronic device 102a to one of a first attribute and a second attribute based on whether a designated condition is satisfied, and establishing wireless communication with the first external electronic device 102a using the attribute of the communication group; maintaining or changing the attribute of the communication group to the second attribute in the state in which the communication group is maintained; and when connection of the wireless communication with a second external electronic device via the communication group is requested, establishing wireless communication with the second external electronic device 120b using the communication group having the second attribute.

According to the electronic device 101 of certain embodiments, the instructions enable the processor 120 to perform: transmitting a message associated with the wireless communication connection to the first external electronic device 102a, via the at least one communication circuit 190; and determining whether the designated condition is satisfied based on at least one of an electronic device's state associated with the request or the transmitted message.

According to the electronic device 101 of certain embodiments, the electronic device's state may include at least one of a state related to executing an application or a service associated with the wireless communication connection, or a state related to an operation attribute of a currently executed application or service, and the message includes at least one from among a Wi-Fi display information element (WFD IE), a peer to peer information element (P2P IE), or Wi-Fi simple configuration information element (WSC IE).

According to the electronic device 101 of certain embodiments, the instructions enable the processor 120 to perform: receiving a message associated with the wireless communication connection from the first external electronic device 102a via the at least one communication circuit 190; and determining whether the designated condition is satisfied based on the received message.

According to the electronic device 101 of certain embodiments, the message includes at least one from among a Wi-Fi display information element (WFD IE), a peer to peer information element (P2P IE), or a Wi-Fi simple configuration information element (WSC IE).

According to the electronic device 101 of certain embodiments, the instructions enable the processor 120 to designate the attribute of the communication group as the first attribute when the designated condition is satisfied, and to establish wireless communication with the first external electronic device 102a.

According to the electronic device 101 of certain embodiments, the instructions enable the processor 120 to designate the attribute of the communication group as the second attribute when the designated condition is not satisfied, and to connect the wireless communication with the first external electronic device 102a.

According to the electronic device 101 of certain embodiments, the instructions enable the processor 120 to designate the attribute of the communication group as the second attribute, and to transmit a message indicating that the attribute of the communication group is the second attribute to the first external electronic device 102a via the at least one communication circuit 190.

A method of connecting short range communication by an electronic device (e.g., the electronic device 101 of FIG. 1), according to certain embodiments, may include: designating an attribute of a communication group with a first external electronic device (e.g., the electronic device 102 of FIG. 1 or the first external electronic device 102a of FIG. 2) as one of a first attribute and a second attribute, and establishing wireless communication with the first external electronic device 102a using the attribute of the communication group; maintaining or changing the attribute of the communication group to the second attribute in the state in which the communication group is maintained; and when the connection of wireless communication with a second external electronic device (e.g., the electronic device 102 of FIG. 1 or the second external electronic device 102b of FIG. 2) via the communication group is requested, connecting the wireless communication with the second external electronic device 102b using the communication group having the second attribute.

According to the short range communication connection method of an electronic device (e.g., the electronic device 101 of FIG. 1), according to certain embodiments, the first attribute of the communication group is associated with a persistent group defined in a Wi-Fi direct protocol, and the second attribute of the communication group is associated with a temporary group defined in the Wi-Fi direct protocol.

According to the short range communication connection method of an electronic device (e.g., the electronic device 101 of FIG. 1), according to certain embodiments, when establishing the communication group having the first attribute may include storing information associated with the communication group, the stored information including role information identifying a group owner and one or more group clients, and at least one authentication credential associated with the communication group.

According to the short range communication connection method of an electronic device (e.g., the electronic device 101 of FIG. 1), according to certain embodiments, the operation of connecting the wireless communication with the first external electronic device 102a may include: designating the attribute of the communication group with the first external electronic device 102a as one of the first attribute and the second attribute based on whether a designated condition is satisfied, establishing a communication group having the designated attribute, and connecting the wireless communication with the first external electronic device 102a.

According to the short range communication connection method of an electronic device (e.g., the electronic device 101 of FIG. 1), according to certain embodiments, the method may further include transmitting, to the first external electronic device 102a, a message associated with the wireless communication connection; and determining whether the designated condition is satisfied based on at least one of an electronic device's state related to the request and the transmitted message.

According to the short range communication connection method of an electronic device (e.g., the electronic device 101 of FIG. 1), according to certain embodiments, the method may further include receiving a message associated with the wireless communication connection from the first external electronic device 102a; and determining whether the designated condition is satisfied based on the received message.

The electronic device according to certain embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   at least one communication circuit configured to provide wireless communication based on a Wi-Fi direct protocol;
   at least one processor operatively connected to the at least one communication circuit; and
   a memory operatively connected to the at least one processor,
   wherein the memory stores instructions executable by the at least one processor to cause the electronic device to:
      establish a communication group including the electronic device and a first external electronic device by connecting the electronic device and the first external electronic device via the at least one communication circuit, wherein an attribute of the communication group is a persistent group, wherein the electronic device is set as a group owner of the communication group and the first external electronic device is set as a group client of the communication group,
      after establishing the communication group, change the attribute of the communication group from the persistent group to a temporary group while the communication group is maintained,
      after changing the attribute of the communication group from the persistent group to the temporary group, identify a request for connecting electronic device and a second external electronic device, and
      based on identifying the request, establish, the communication group including the electronic device, the first external electronic device, and the second external electronic device by connecting, using the temporary group, the electronic device and the second external electronic device, wherein the electronic device is set as the group owner of the communication group, and the first electronic device and the second external electronic device are set as group clients of the communication group.

2. The electronic device of claim 1, wherein the persistent group and the temporary group are attributes defined in the Wi-Fi direct protocol.

3. The electronic device of claim 1, wherein the electronic device is set as the group owner, as defined in the Wi-Fi direct protocol, and
   wherein the first external electronic device and the second external electronic device are set as the group clients, as defined in the Wi-Fi direct protocol.

4. The electronic device of claim 1, wherein the instructions are further executable by the at least one processor to cause the electronic device to store information associated with the communication group in the memory.

5. The electronic device of claim 4, wherein the stored information includes role information identifying the group owner and one or more group clients, and at least one authentication credential associated with the communication group.

6. The electronic device of claim 1, wherein the instructions are further executable by the at least one processor to cause the electronic device to transmit, via the at least one communication circuit, a message to the first external electronic device, the message indicating that the attribute of the communication group is persistent group.

7. An electronic device, comprising:
   at least one communication circuit configured to provide wireless communication based on a Wi-Fi direct protocol;
   at least one processor operatively connected to the at least one communication circuit; and
   a memory operatively connected to the at least one processor, the memory storing programming instructions executable by the at least one processor to cause the electronic device to:
      based on whether a condition designated for setting an attribute of a communication group as a persistent group is satisfied, set the attribute of the communication group including the electronic device and a first external electronic device as the persistent group,
      establish, using the persistent group, the communication group by initiating wireless communication between the electronic device and the first external electronic device, wherein the electronic device is set as a group owner of the communication group and the first external electronic device is set as a group client of the communication group,
      after establishing the communication group, change the attribute of the communication group from the persistent group to a temporary group while the communication group is maintained,
      after changing the attribute of the communication group from the persistent group to the temporary group, identify a request for connecting the electronic device and a second external electronic device, and
      based on identifying the request, establish the communication group including the electronic device, the first external electronic device, and the second external electronic device by connecting, using the temporary group, the electronic device and the second external electronic device, wherein the electronic device is set as the group owner of the communication group, and the first external electronic device and the second external electronic device are set as group clients of the communication group.

8. The electronic device of claim 7, wherein the instructions are further executable by the at least one processor to cause the electronic device to:
transmit a message associated with a wireless communication connection to the first external electronic device, via the at least one communication circuit, and
determine whether the condition is satisfied based on at least one of:
a detected state of the electronic device or
the transmitted message.

9. The electronic device of claim 8, wherein the detected state of a particular electronic device state includes at least one of: a first state including execution of an application or a service associated with the wireless communication connection, or a second state based at least in part on an operational attribute of a currently executed application or service, and
wherein the transmitted message includes at least one of a Wi-Fi display information element (WFD IE), a peer to peer information element (P2P IE), or Wi-Fi simple configuration information element (WSC IE).

10. The electronic device of claim 7, wherein the instructions are further executable by the at least one processor to cause the electronic device to:
receive a message associated with a wireless communication connection from the first external electronic device via the at least one communication circuit, and
determine whether the condition is satisfied based on the received message.

11. The electronic device of claim 10, wherein the message includes at least one of a Wi-Fi display information element (WFD IE), a peer to peer information element (P2P IE), or a Wi-Fi simple configuration information element (WSC IE).

12. The electronic device of claim 7, wherein when the condition is satisfied, the attribute of the communication group is set as the persistent group.

13. The electronic device of claim 7, wherein, when the condition is not satisfied, the attribute of the communication group is set as the temporary group.

14. The electronic device of claim 13, wherein the instructions are further executable by the at least one processor to cause the electronic device to:
when the attribute is set as the temporary group,
transmit a message indicating that the attribute of the communication group is the temporary group to the first external electronic device via the at least one communication circuit.

15. A method in an electronic device, comprising:
based on whether a condition designated for setting an attribute of a communication group as a persistent group is satisfied, setting an attribute of the communication group including the electronic device and a first external electronic device as the persistent group;
establishing, using the persistent group, the communication group by initiating wireless communication between the electronic device and the first external electronic device, wherein the electronic device is set as a group owner of the communication group and the first external electronic device is set as a group client of the communication group;
after establishing the communication group, changing the attribute of the communication group from the persistent group to a temporary group while the communication group is maintained;
after changing the attribute of the communication group from the persistent group to the temporary group, identifying a request for connecting the electronic device and a second external electronic device; and
based on identifying the request, establishing the communication group including the electronic device, the first external electronic device, and the second external electronic device by connecting, using the temporary group, the electronic device and the second external electronic device, wherein the electronic device is set as the group owner of the communication group, and the first external electronic device and the second external electronic device are set as group clients of the communication group.

16. The method of claim 15, wherein the persistent group and the temporary group are attributes defined in a Wi-Fi direct protocol.

17. The method of claim 15, further comprises when the attribute of the communication group is the persistent group, storing information associated with the communication group, the stored information including role information identifying the group owner and one or more group clients, and at least one authentication credential associated with the communication group.

18. The method of claim 15, wherein setting the attribute of the communication group as the persistent group comprises when the condition is satisfied, setting the attribute of the communication group as the persistent group.

19. The method of claim 18, further comprising:
transmitting, to the first external electronic device, a message associated with a wireless communication connection; and
determining whether the designated condition is satisfied based on at least one of: a detected state of the electronic device, or the transmitted message.

20. The method of claim 18, further comprising:
receiving a message associated with a wireless communication connection from the first external electronic device; and
determining whether the condition is satisfied based on the received message.

* * * * *